(12) United States Patent
Liu et al.

(10) Patent No.: US 11,314,360 B2
(45) Date of Patent: Apr. 26, 2022

(54) TOUCH PANEL AND TOUCH DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Chunjian Liu, Beijing (CN); Tianqing Liu, Beijing (CN); Zouming Xu, Beijing (CN); Lei Zhang, Beijing (CN); Jian Tian, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 202 days.

(21) Appl. No.: 16/621,320

(22) PCT Filed: Mar. 25, 2019

(86) PCT No.: PCT/CN2019/079585
§ 371 (c)(1),
(2) Date: Dec. 11, 2019

(87) PCT Pub. No.: WO2020/001098
PCT Pub. Date: Jan. 2, 2020

(65) Prior Publication Data
US 2021/0325999 A1    Oct. 21, 2021

(30) Foreign Application Priority Data

Jun. 29, 2018 (CN) .......................... 201810701060.4

(51) Int. Cl.
*G06F 3/044*    (2006.01)
*G06F 3/041*    (2006.01)

(52) U.S. Cl.
CPC .......... *G06F 3/0443* (2019.05); *G06F 3/0412* (2013.01); *G06F 3/0446* (2019.05);
(Continued)

(58) Field of Classification Search
CPC .... G06F 3/0443; G06F 3/0412; G06F 3/0446; G06F 3/04164; G06F 3/041662; G06F 2203/04111; G06F 2203/04103
See application file for complete search history.

(56) References Cited

U.S. PATENT DOCUMENTS

2009/0315854 A1* 12/2009 Matsuo ................. G06F 3/0443
345/174
2012/0062464 A1    3/2012 Otagaki et al.
(Continued)

FOREIGN PATENT DOCUMENTS

CN    102411461 A    4/2012
CN    106855767 A    6/2017
(Continued)

OTHER PUBLICATIONS

Office Action issued in corresponding 201810701060.4 dated Sep. 2, 2019.
(Continued)

*Primary Examiner* — Md Saiful A Siddiqui
(74) *Attorney, Agent, or Firm* — Arent Fox LLP; Michael Fainberg

(57) ABSTRACT

Embodiments of this disclosure disclose a touch panel and a touch display device. The touch panel includes: an underlying substrate; and a plurality of touch electrodes arranged on the underlying substrate, and insulated from each other. At least one of the plurality of touch electrodes includes a plurality of annular touch electrode sections arranged at an interval. Every two adjacent touch electrode sections in the same touch electrode are electrically connected through a plurality of connection sections. The capability of the electrodes to withstand bending can be improved to thereby prevent the touch panel from being broken while being bent.

20 Claims, 20 Drawing Sheets

(52) U.S. Cl.
CPC .... *G06F 3/04164* (2019.05); *G06F 3/041662* (2019.05); *G06F 2203/04103* (2013.01); *G06F 2203/04111* (2013.01)

(56) References Cited

U.S. PATENT DOCUMENTS

| | | | |
|---|---|---|---|
| 2016/0202827 A1* | 7/2016 | Bae | G06F 3/0443 345/174 |
| 2016/0216806 A1* | 7/2016 | Nakamura | B32B 15/02 |
| 2016/0246393 A1* | 8/2016 | Lee | G06F 3/041 |
| 2016/0378240 A1* | 12/2016 | Li | G06F 3/0412 345/174 |
| 2018/0196558 A1 | 7/2018 | Wang | |
| 2018/0324939 A1 | 11/2018 | Wang | |

FOREIGN PATENT DOCUMENTS

| | | |
|---|---|---|
| CN | 107025853 A | 8/2017 |
| CN | 107957813 A | 4/2018 |
| CN | 109002205 A | 12/2018 |
| JP | 2015194856 A | 11/2015 |

OTHER PUBLICATIONS

Office Action issued in corresponding 201810701060.4 dated Mar. 18, 2020.

\* cited by examiner

TOUCH PANEL AND TOUCH DISPLAY DEVICE

This application is a US National Stage of International Application No. PCT/CN2019/079585, filed Mar. 25, 2019, which claims the benefits of Chinese Patent Application No. 201810701060.4, filed with the Chinese Patent Office on Jun. 29, 2018, and entitled "A touch panel and a touch display device", which is hereby incorporated by reference in its entirety.

FIELD

This disclosure relates to the field of touch technologies, and particularly to a touch panel and a touch display device.

BACKGROUND

With the development of the field of display technologies, touch technologies have been widely applied to various display devices, e.g., a smart mobile phone, a tablet computer, etc., with a touch function. Particularly the quality of touch electrodes is a dominating factor of the performance of a touch panel in use.

At present, a flexible touch screen includes a structure of two layers of sensing films, and a structure of a single layer of thin sensing film. For example, the structure of two layers of sensing films includes a glass layer, a film layer, and another film layer (simply GFF), and the structure of a single layer of thin sensing film includes a glass layer and a film layer (simply G1F) (i.e. electrodes are located on one side of the film, and at different layers), a glass layer and a film layer (simply GF2) (i.e. electrodes are located on two sides of the film, and at different layers), and a glass layer and a film layer (simply GF) (i.e. electrodes are located on one side of the film, and at the same layer, and include bridge structures). The electrode layers in the GF structure include the bridge structures, so a product with a small curvature may be fabricated, or a touch sensor may be fabricated, and they have been manufactured by various touch panel (TP) manufacturers.

SUMMARY

Some embodiments of this disclosure provide a touch panel. The touch panel includes: an underlying substrate; and a plurality of touch electrodes arranged on the underlying substrate, and insulated from each other. At least one of the plurality of touch electrodes includes a plurality of annular touch electrode sections arranged at an interval. Every two adjacent touch electrode sections in the same touch electrode are electrically connected through a plurality of connection sections.

Optionally in the embodiments of this disclosure, the plurality of touch electrodes include a plurality of first touch electrodes extending in a first direction, and a plurality of second touch electrodes extending in a second direction.

Optionally in the embodiments of this disclosure, the respective touch electrodes are arranged at the same layer. Each of the plurality of first touch electrodes includes a plurality of first sub-touch electrodes arranged to be spaced from the second touch electrodes. Each of the plurality of first sub-touch electrodes includes a plurality of annular touch electrode sections arranged at an interval. Two first sub-touch electrodes in the same first touch electrode, located on two sides of the second touch electrode are electrically connected by being bridged through a first connection line.

Optionally in the embodiments of this disclosure, there is at least one first connection line electrically connected between two adjacent first sub-touch electrodes.

Optionally in the embodiments of this disclosure, for the plurality of first sub-touch electrodes included in each first touch electrode, there is the same pattern of touch electrode sections in respective remaining first sub-touch electrodes except for first sub-touch electrodes located at ends of each first touch electrode.

Optionally in the embodiments of this disclosure, each of the plurality of second touch electrodes includes a plurality of second sub-touch electrodes and a plurality of second connection lines. The plurality of second sub-touch electrodes are arranged to be spaced from the plurality of first touch electrodes. Two second sub-touch electrodes in the same second touch electrode, located on two sides of the first touch electrode are electrically connected through the second connection line. Each of the plurality of second sub-touch electrodes include a plurality of annular touch electrode sections arranged at an interval.

Optionally in the embodiments of this disclosure, for the plurality of second sub-touch electrodes comprised in each second touch electrode, there is the same pattern of touch electrode sections in respective remaining second sub-touch electrodes except for second sub-touch electrodes located at ends of each second touch electrode.

Optionally in the embodiments of this disclosure, for respective remaining first sub-touch electrodes except for first sub-touch electrodes located at ends of each first touch electrode, and respective remaining second sub-touch electrodes except for second sub-touch electrodes located at ends of each second touch electrode, a pattern of touch electrode sections in the respective remaining first sub-touch electrodes is the same as a pattern of touch electrode sections in the respective remaining second sub-touch electrodes.

Optionally in the embodiments of this disclosure, the plurality of touch electrodes include self-capacitive electrodes arranged in an array.

Optionally in the embodiments of this disclosure, the touch panel further includes dummy strip electrodes arranged at gaps between two adjacent touch electrodes.

Optionally in the embodiments of this disclosure, a width of a gap between each touch electrode and an adjacent dummy strip electrode lies between 20 micrometers and 30 micrometers.

Optionally in the embodiments of this disclosure, the dummy strip electrodes are arranged at the same layer as the plurality of touch electrodes.

Optionally in the embodiments of this disclosure, a width of a gap between adjacent touch electrode sections lies between 20 micrometers and 30 micrometers.

Optionally in the embodiments of this disclosure, connection sections are distributed uniformly between every two adjacent touch electrode sections.

Optionally in the embodiments of this disclosure, a pattern of the touch electrode sections includes at least one of a triangle, a diamond, or a rectangle.

Optionally in the embodiments of this disclosure, the pattern of the touch electrode sections is the diamond; and an angle between one side of the pattern of the touch electrode sections in the first sub-touch electrodes, and one of a first direction or a second direction, ranges from 30 to 60 degrees.

Optionally in the embodiments of this disclosure, edges of the touch electrode sections are at least one of straight, curved, or folded.

Correspondingly the embodiments of this disclosure further provide a touch display device including the touch panel above.

BRIEF DESCRIPTION OF THE DRAWINGS

The drawings are intended to provide further understanding of the technical solutions according to the embodiments of this disclosure, constitute a part of the specification, and serve together with the embodiments of this disclosure to explain the technical solutions according to the embodiments of this disclosure, but shall not limit the technical solutions thereto.

DETAILED DESCRIPTION OF THE EMBODIMENTS

Figure 1:
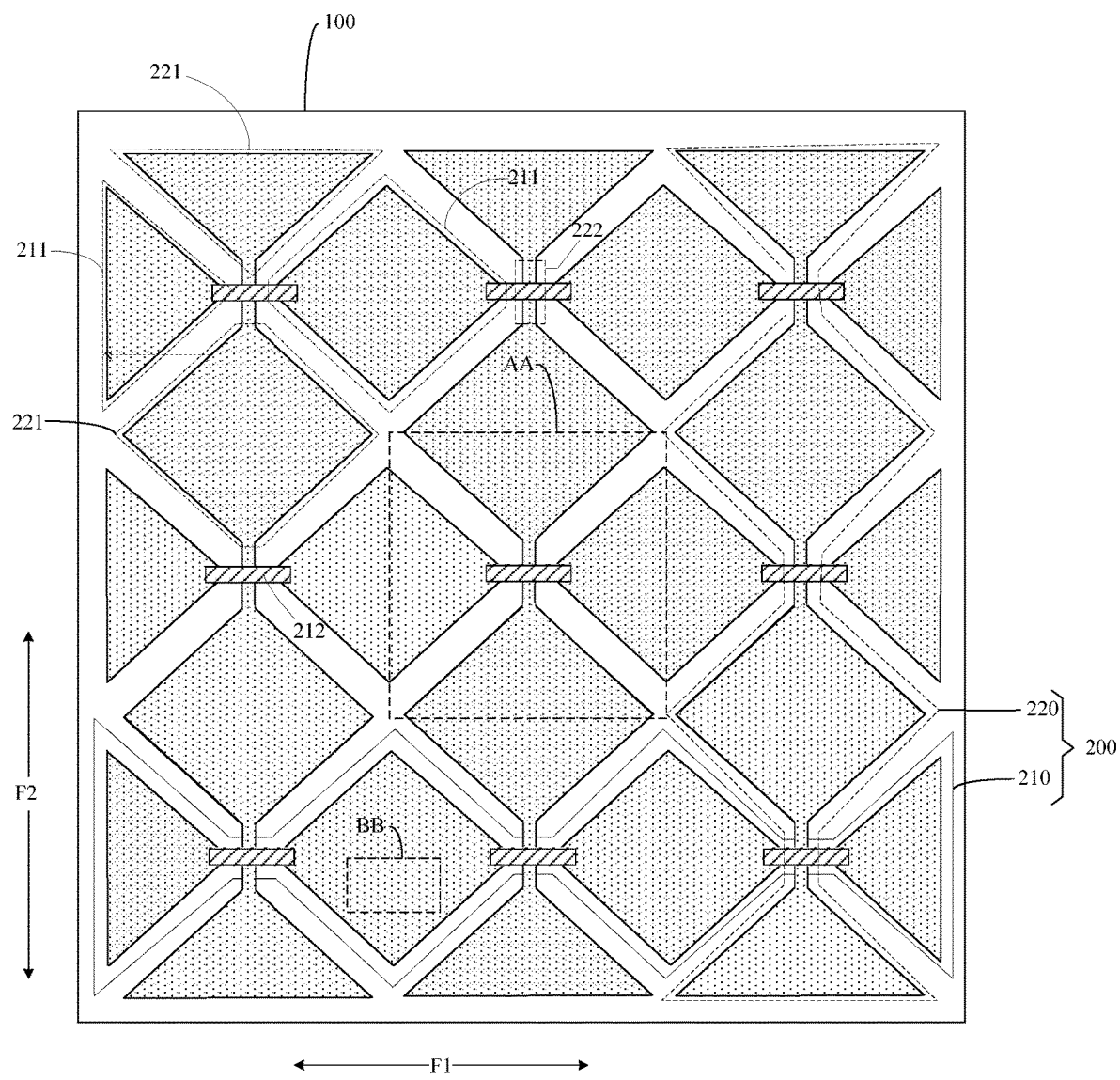
FIG. 1 is a first schematic structural diagram of a touch panel according to some embodiments of this disclosure.

In order to make the objects, the technical solutions, and the advantages of this disclosure more apparent, the embodiments of this disclosure will be described below in details with reference to the drawings. The embodiments of this disclosure and the features in the embodiments may be combined with each other unless they conflict with each other. The embodiments to be described below are merely intended to illustrate and explain this disclosure, but not to limit this disclosure thereto. The sizes and the shapes of respective components in the drawings are not intended to reflect any real proportion, but only intended to illustrate this disclosure. Like or similar reference numerals throughout the drawings refer to like or similar elements, or elements with like or similar functions.

The operations illustrated in the flow chart in the drawings may be performed in a computer system including a set of computer executable instructions, for example. Although a logic order is illustrated in the flow chart, the illustrated or described operations may be performed in a different order from the order here in some instance.

The following embodiments of this disclosure may be combined with each other, and a repeated description of like or similar concepts or processes may be omitted in some embodiments of this disclosure.

There are a number of problems to be addressed in the process of fabricating the existing GF, including the following two ones. First, an electrode pattern of a touch element in the GF is an integral electrode, and the electrode is so large that there is a significant stress in the electrode itself, so it tends to be broken while being bent. Second, the material of a bridge point is metal so that the metal bridge has good extensibility, but there may be a poor effect of eliminating a shadow, and a poor adhesion effect. If the bridge is made of Indium Tin Oxide (ITO), then there will be a good effect of eliminating a shadow, but the ITO material is so brittle that it tends to be broken while being bent.

As high-end mobile phones with a full-screen panel are produced at a large massively, flexible touch screens with small and middle sizes are developing rapidly. In the process of fabricating a flexible touch screen, applications of the GF2 structure and the GF bridge structure including a single film are more promising than the GFF including two films. The electrode layers in the GF structure include bridge structures, so a product with a small curvature may be fabricated, or a touch sensor may be fabricated, and they have been manufactured by various touch panel (TP) manufacturers.

In the existing touch panel above, there is a poor capability of electrodes to withstand bending because the electrodes are typically designed in an integral shape. For example, an entire touch panel includes a plurality of rows of traverse electrodes, and a plurality of columns of longitudinal electrodes, where both each row of traverse electrodes, and each column of longitudinal electrodes are formed in an integral pattern, so that the size of the electrode pattern is so large that there is such a significant stress in the electrodes that the touch panel tends to be broken while being bent. Moreover it may be difficult to make a tradeoff between the effect of eliminating a shadow, and the capability to withstand bending in the bridge structure of the GF.

In order to address the technical problems above, the embodiments of this disclosure provide a touch panel and a touch display device. A pattern of touch electrodes may be configured reasonably for the effect of alleviating a stress in the electrodes so as to improve the capability of the touch electrodes to withstand bending, and to prevent the touch panel from being broken while being bent.

As illustrated in FIG. 1 to FIG. 4, a touch panel according to some embodiments of this disclosure includes: an underlying substrate 100, and a plurality of touch electrodes 200 arranged on the underlying substrate 100, and insulated from each other. At least a part of the plurality of touch electrodes 200 include a plurality of annular touch electrode sections 300 arranged at an interval. Every two adjacent touch electrode sections 300 in the same touch electrode 200 are electrically connected through a plurality of connection sections 400. The connection sections 400 are arranged as small rectangular blocks.

In the touch panel according to the embodiments of this disclosure, the touch electrodes include a plurality of annular touch electrode sections arranged at an interval, and every two adjacent touch electrode sections in the same touch electrode are electrically connected through a plurality of connection sections, so that gaps may be formed between the touch electrode sections, so there is some spacing (i.e., the size of a gap) between the annular touch electrode sections spaced by the gaps to thereby release a stress, so as to improve the capability of the electrodes to withstand bending, and to prevent the electrodes from being broken while being bent.

This disclosure will be described below in details in connection with particular embodiments thereof. It shall be noted that the embodiments are intended to better explain this disclosure, but not to limit this disclosure thereto.

Figure 3:
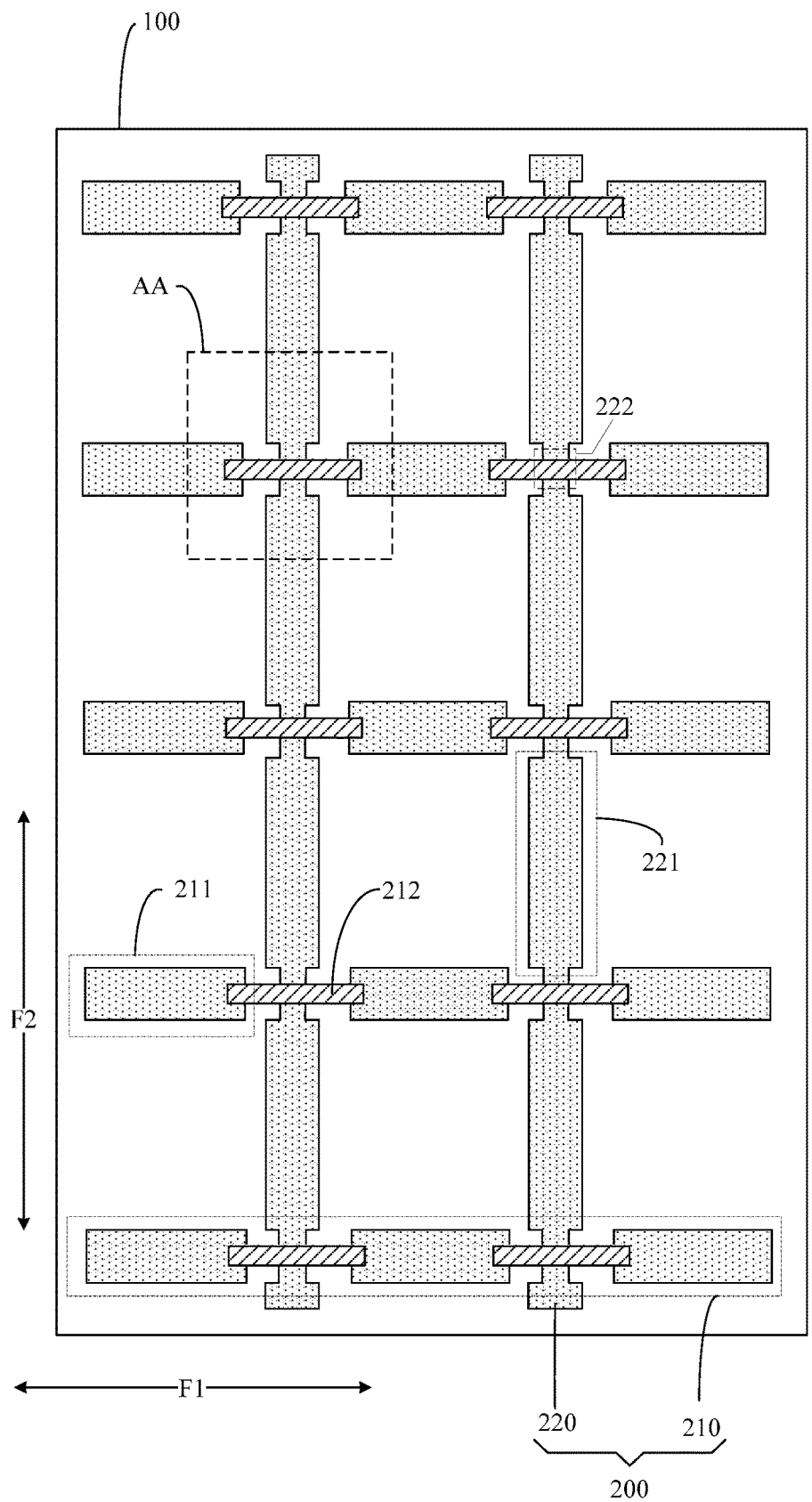
FIG. 3 is a second schematic structural diagram of a touch panel according to some embodiments of this disclosure.

In a particular implementation, in the embodiments of this disclosure, as illustrated in FIG. 1 and FIG. 3, the plurality of touch electrodes include: a plurality of first touch electrodes 210 extending in a first direction F1, and a plurality of second touch electrodes 220 extending in a second direction F2, so that the touch panel may perform a touch function in a mutually-capacitive principle.

There may be an angle smaller than or equal to 90° between the first direction and the second direction, for example. In the respective embodiments of this disclosure, the angle between the first direction and the second direction is 90°, for example, so that the first direction F1 is the row direction, and the second direction F2 is the column direction, or the first direction F1 is the column direction, and the second direction F2 is the row direction, and the embodiments of this disclosure will not be limited thereto. Hereinafter, the first direction F1 is the row direction, and the second direction F2 is the column direction as an example.

In a particular implementation, in the embodiments of this disclosure, as illustrated in FIG. 1 and FIG. 3, the respective touch electrodes may be arranged at the same layer so that the first touch electrodes 210 and the second touch electrodes 220 are arranged on the same film to thereby further reduce thickness of the touch panel. Thus, the respective touch electrodes may be patterned in one patterning process to thereby simplify the fabrication process, save the production cost, and improve the production efficiency, and so that the embodiments of this disclosure provide a design of a touch electrode pattern for performing a touch function to thereby address the problem above of the GF structure.

In a particular implementation, in the embodiments of this disclosure, as illustrated in FIG. 1 and FIG. 3, each of the first touch electrodes 210 includes a plurality of first sub-touch electrodes 211 arranged to be spaced from the second touch electrodes 220. Two first sub-touch electrodes 211 in the same first touch electrode 210, located on two sides of the second touch electrode 220 are electrically connected by being bridged through a first connection line 212.

Figure 2A:
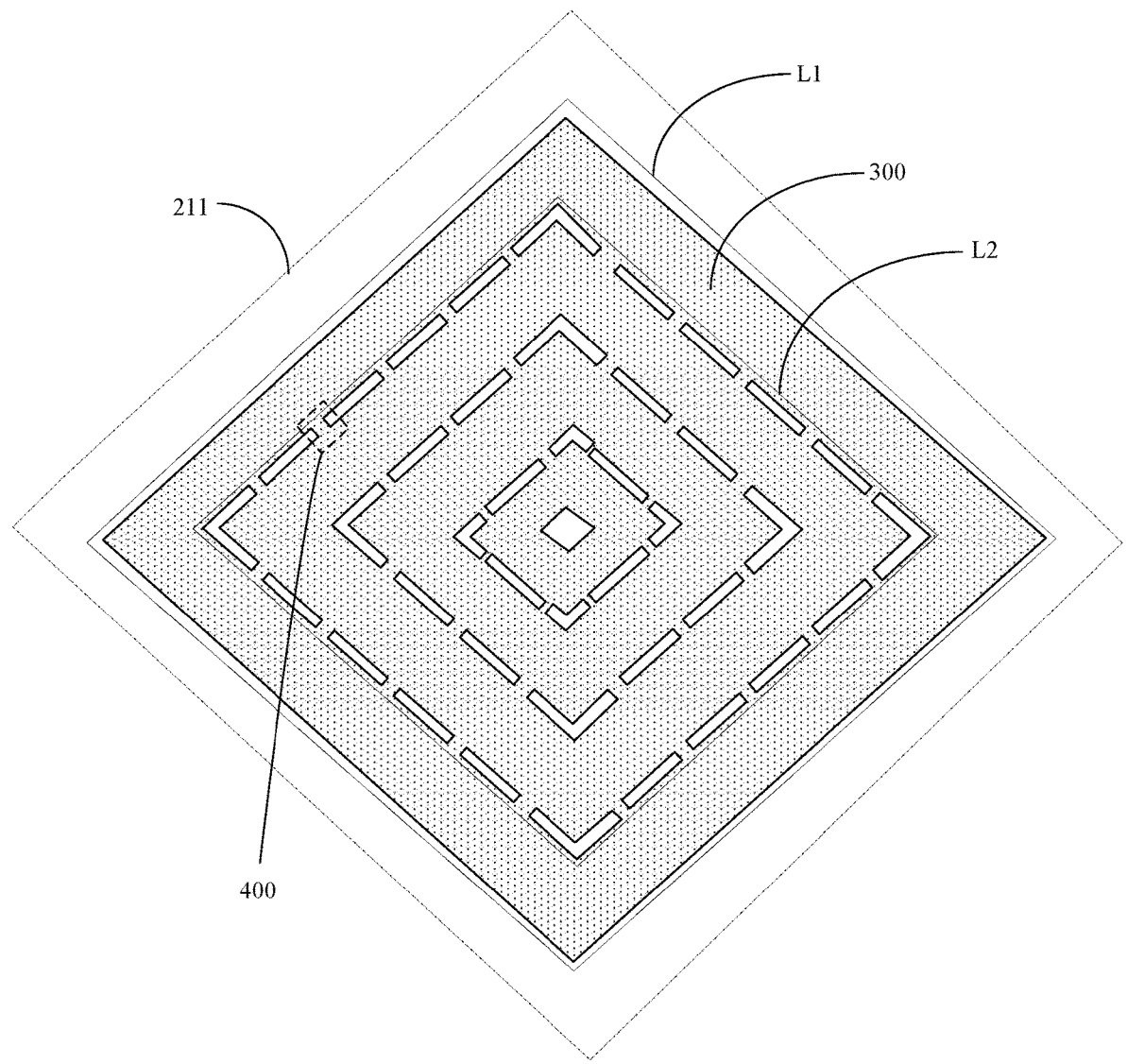
FIG. 2A is a first schematic structural diagram of a first sub-touch electrode according to some embodiments of this disclosure.
Figure 4A:
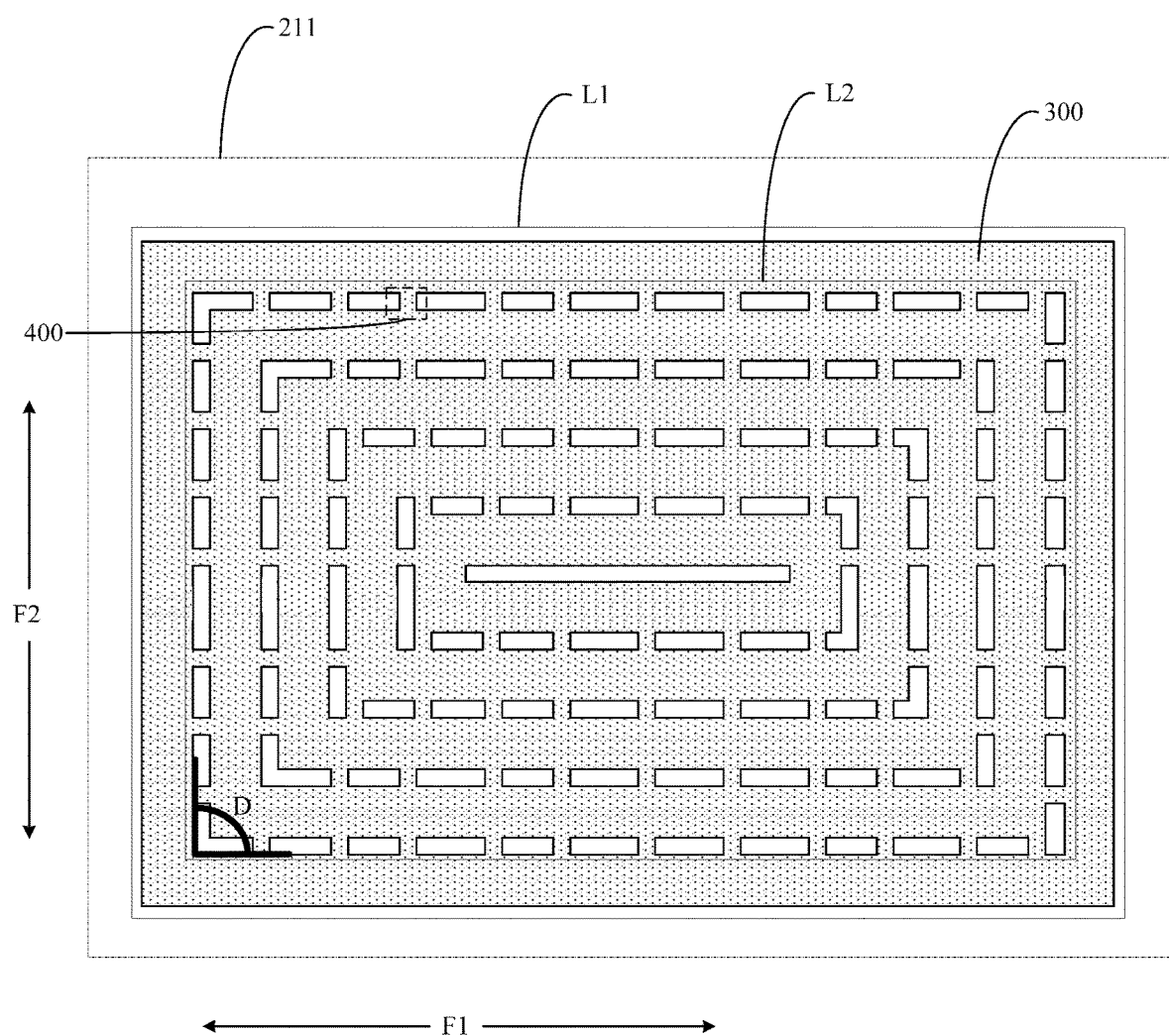
FIG. 4A is a second schematic structural diagram of a first sub-touch electrode according to some embodiments of this disclosure.

As illustrated in FIG. 2A and FIG. 4A, the respective first sub-touch electrodes 211 include a plurality of annular touch electrode sections 300 arranged at an interval, and every two adjacent touch electrode sections 300 in the same first sub-touch electrode 211 are electrically connected through a plurality of connection sections 400. In this way, there are a plurality of gaps arranged in the respective first sub-touch electrodes 211 so that there is some spacing (i.e., the size of an opening) between the annular touch electrode sections 300 spaced by the gaps to thereby release a stress so as to improve the capability of the electrodes to withstand bending, and to prevent the electrodes from being broken while being bent.

It shall be noted that an area between a dotted box L1 and a dotted box L2 as illustrated in FIG. 2A and FIG. 4A represents a touch electrode section 300, and an area surrounded by a dotted box 400 represents a connection section 400.

In an implementation, the first sub-touch electrodes are not formed in an integral pattern, but integrally formed of a plurality of touch electrode sections spaced at an interval.

Optionally the first sub-touch electrodes may be formed in such a way that a plurality of touch electrode sections arranged at an interval are arranged in order in a specific repeating combination to form an electrode pattern arranged in order, and these electrode patterns arranged in order may be applied to the touch panel to thereby improve the effect of eliminating a shadow throughout the touch panel.

In a particular implementation, in the embodiments of this disclosure, as illustrated in FIG. 1 and FIG. 3, each of the second touch electrodes 220 includes a plurality of second sub-touch electrodes 221 and a plurality of second connection lines 222, where the second sub-touch electrodes 221 are arranged to be spaced from the first touch electrodes 210. Two second sub-touch electrodes 221 in the same second touch electrode 220, located on two sides of the first touch electrode 210 are electrically connected through the second connection line 222, and the respective second sub-touch electrodes 221 include a plurality of annular touch electrode sections 300 arranged at an interval.

In this way, there are a plurality of gaps arranged in the respective second sub-touch electrodes 221 so that there is some spacing (i.e., the size of an opening) between the annular touch electrode sections 300 spaced by the gaps to thereby release a stress so as to improve the capability of the electrodes to withstand bending, and to prevent the electrodes from being broken while being bent.

Figure 2B:
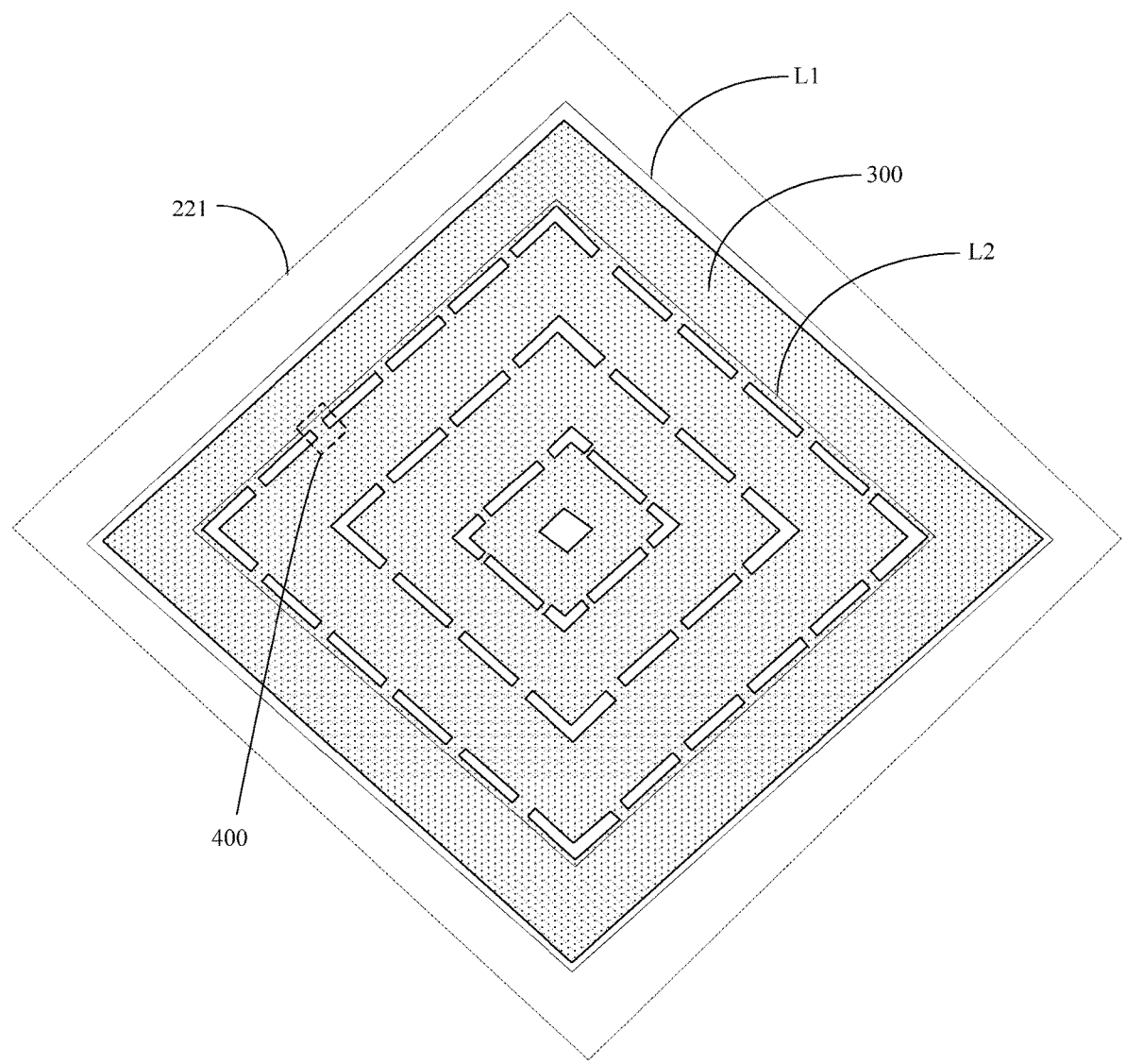
FIG. 2B is a first schematic structural diagram of a second sub-touch electrode according to some embodiments of this disclosure.
Figure 4B:
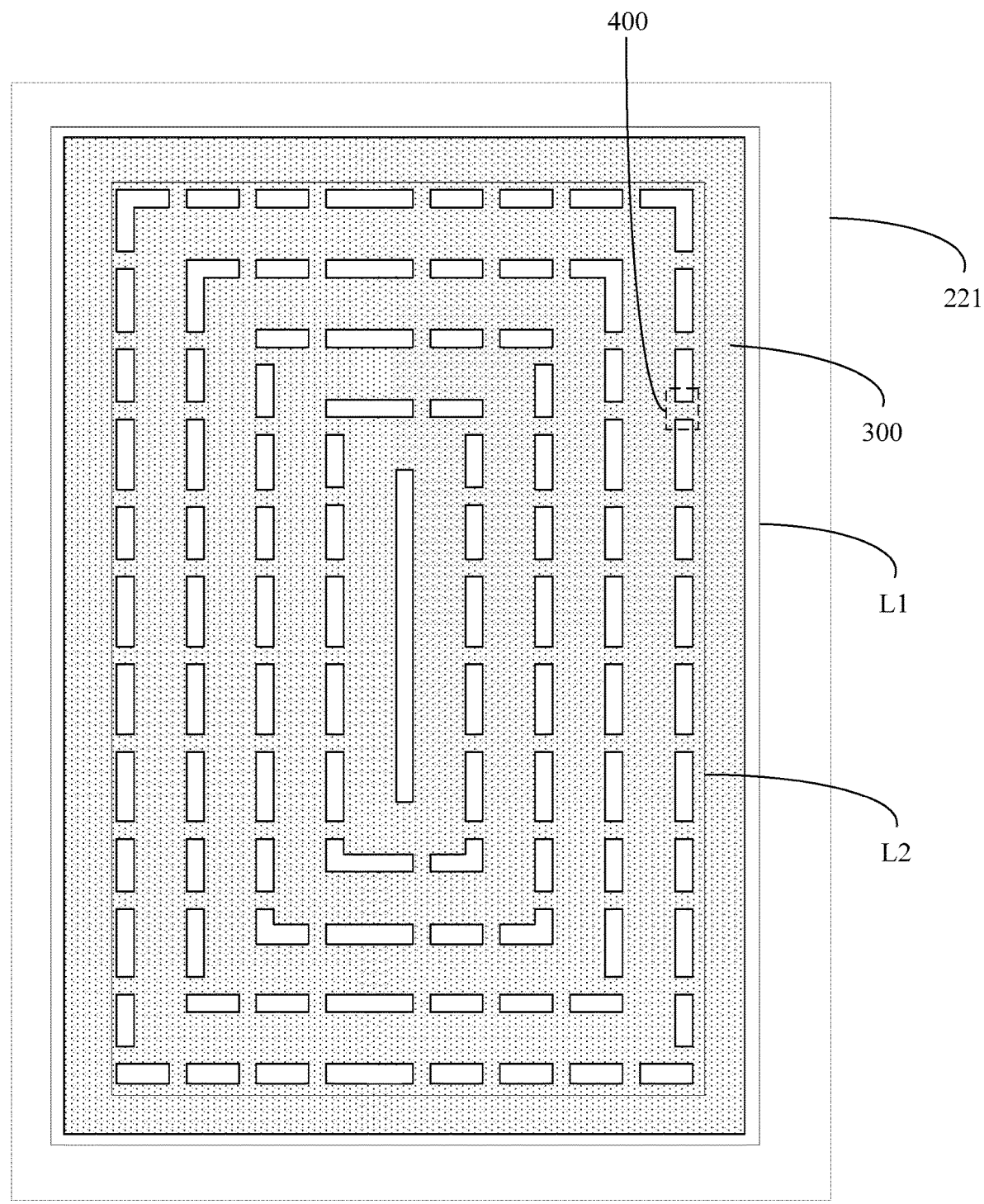
FIG. 4B is a second schematic structural diagram of a second sub-touch electrode according to some embodiments of this disclosure.

It shall be noted that an area between a dotted box L1 and a dotted box L2 as illustrated in FIG. 2B and FIG. 4B represents a touch electrode section 300, and an area surrounded by a dotted box 400 represents a connection section 400. Furthermore the respective second sub-touch electrodes 221 are arranged at the same layer as the respective second connection lines 222.

It shall be noted that each second connection line 222 is located between adjacent second sub-touch electrodes 221, and is the narrowest area of each second touch electrode 220. Since adjacent first sub-touch electrodes 211 actually function as an electrode, the adjacent first sub-touch electrodes 211 may be electrically connected by a first connection line 212.

In view of the relative positional relationship between the first touch electrode 210 and the second touch electrode 220, the difficulty to perform a bridging process, and the stability of the electrode structure, the first connection line 212 may be arranged in the narrowest area of the second touch electrode 220, i.e., above the second connection line 222.

In a particular implementation, the second sub-touch electrodes are not formed in an integral pattern, but integrally formed of a plurality of touch electrode sections arranged at an interval. Optionally the second sub-touch electrodes may be formed in such a way that a plurality of touch electrode sections arranged at an interval are arranged in order in a specific repeating combination to form an electrode pattern arranged in order, and these electrode patterns arranged in order may be applied to the touch panel to thereby improve the effect of eliminating a shadow throughout the touch panel.

Furthermore in a particular implementation, in the embodiments of this disclosure, the respective connection sections and the respective touch electrodes may be arranged at the same layer so that the respective touch electrodes and the respective connection sections may be patterned in a patterning process to thereby simplify the fabrication process, save the production cost, and improve the production efficiency.

In a particular implementation, in the embodiments of this disclosure, at least one first connection line electrically connected between two adjacent first sub-touch electrodes may be arranged.

Particularly as illustrated in FIG. 1 and FIG. 3, one first connection line 212 electrically connected between two adjacent first sub-touch electrodes 211 may be arranged.

Figure 5:
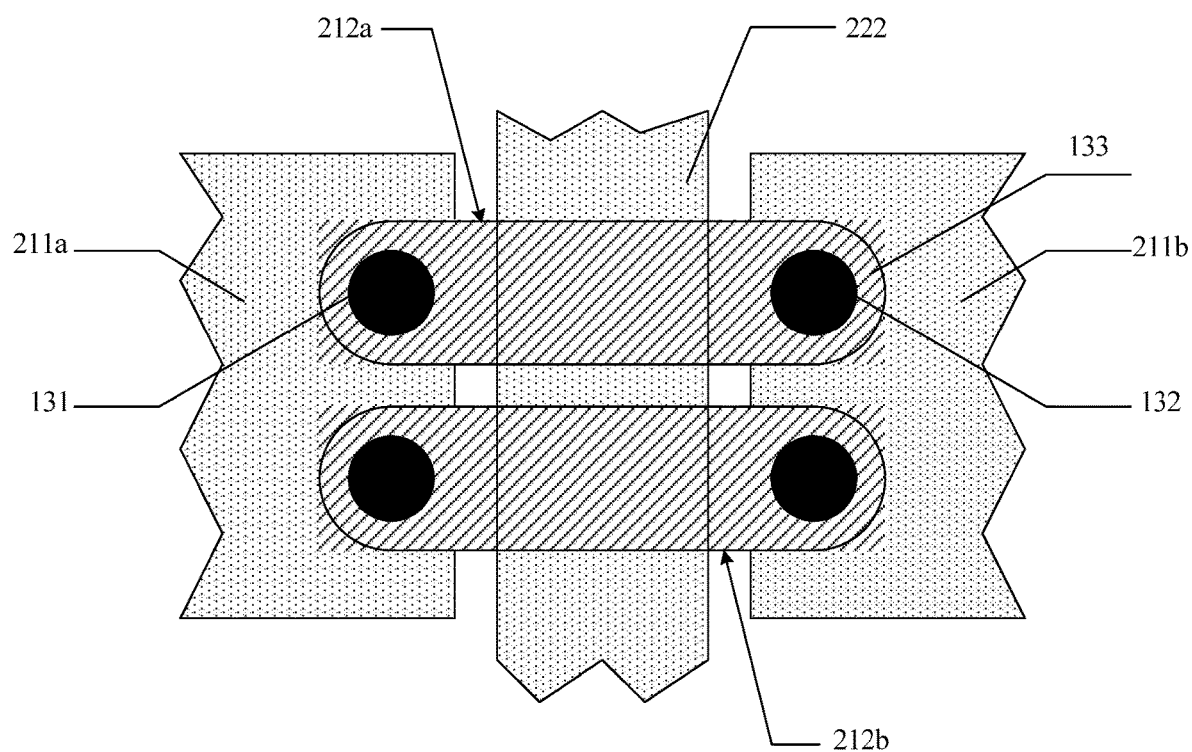
FIG. 5 is a schematic structural diagram of a first connection line according to some embodiments of this disclosure.

Furthermore as illustrated in FIG. 5, two first connection lines 212 electrically connected between two adjacent first sub-touch electrodes 211 may be arranged so that if one of the first connection lines 212 is broken, then the other first connection line 212 may connect the two adjacent first sub-touch electrodes 211 to thereby guarantee the validity of the electrode.

Furthermore three, four, fifth, etc., first connection lines 212 electrically connected between two adjacent first sub-touch electrodes 211 may be arranged.

Of course, the number of first connection lines 212 electrically connected between two adjacent first sub-touch electrodes 211 may be determined as needed in a real application environment, although the embodiment of this disclosure will not be limited thereto.

In a particular implementation, as illustrated in FIG. 5, two first connection lines 212a and 212b are arranged between two adjacent first sub-touch electrodes in the same first touch electrode 210, where each first connection line includes a bridge 133, and two bridge points 131 and 132.

Taking two adjacent first sub-touch electrodes 211a and 211b and the first connection line 212a as an example, the bridge 133 of the first connection line 212a is electrically connected with the first sub-touch electrode 211a through the bridge point 131, and the bridge 133 of the first connection line 212a is electrically connected with the first sub-touch electrode 211b through the bridge point 132, so that the two adjacent first sub-touch electrodes may be electrically connected.

As can be appreciated, in the structure of the touch panel, in order to avoid the first connection lines from being electrically connected with the second touch electrodes 220, the electrode layer where the first touch electrodes and the second touch electrodes are located is arranged at a different layer from the layer where the respective first connection lines are located, and an insulation layer may be arranged between the electrode layer, and the layer where the first connection lines 212 are located, where the insulation layer includes through-holes for arranging the bridge points (i.e., the bridge points 131 and 132) therein, that is, the bridge point 131 is arranged in the through-hole at the insulation layer above the first sub-touch electrode 211a, and the bridge point 132 is arranged in the through-hole at the insulation layer above the first sub-touch electrode 211b.

The first sub-touch electrodes and at least two first connection lines for electrically connecting two adjacent first sub-touch electrodes are an integral structure constituting the first touch electrode.

As can be apparent from the pattern of the touch electrode, the bridge points are typically arranged at the positions in the first sub-touch electrodes proximate to the second connection lines 222 so that the first connection lines 212 may be made as short as possible, and thus more stable in structure, and easy to form in a process. Of course, the first connection lengths may alternatively be made slightly longer, although the embodiment of this disclosure will not be limited thereto.

Furthermore in the embodiment of this disclosure, the insulation layer may be arranged as a planarization layer so that the first connection lines may be made flat.

Optionally in the embodiments of this disclosure, the material of the first connection lines may be indium tin oxide (ITO), indium zinc oxide (IZO), a carbon nanometer carbon tube, graphite olefin, etc. Of course, the material of the first connection lines may alternatively be another transparent electrically-conductive material in a real application, although the embodiment of this disclosure will not be limited thereto. In view of the shape of the pattern of the touch electrode in the embodiment of this disclosure, the first connection line made of ITO have a better capability to withstand bending than the first connection lines made of ITO in the electrode pattern in the related art.

In a particular implementation, in the embodiment of this disclosure, the material of the touch electrode may be indium tin oxide (ITO), indium zinc oxide (IZO), a carbon nanometer carbon tube, graphite olefin, etc. Of course, the material of the touch electrode may alternatively be another transparent electrically-conductive material in a real application, although the embodiment of this disclosure will not be limited thereto.

In a particular implementation, in the embodiments of this disclosure, the pattern of the touch electrode sections may include at least one of a triangle, a diamond, or a rectangle.

As illustrated in FIG. 1 to FIG. 2B, for example, the pattern of the touch electrode section 300 may be arranged as a diamond. As illustrated in FIG. 2 to FIG. 4B, for example, the pattern of the touch electrode section 300 may be arranged as a rectangle.

Alternatively the pattern of the touch electrode section 300 may be arranged as a triangle. Of course, the pattern of the touch electrode section 300 may be arranged as needed in a real application environment, although the embodiment of this disclosure will not be limited thereto.

Figure 6:
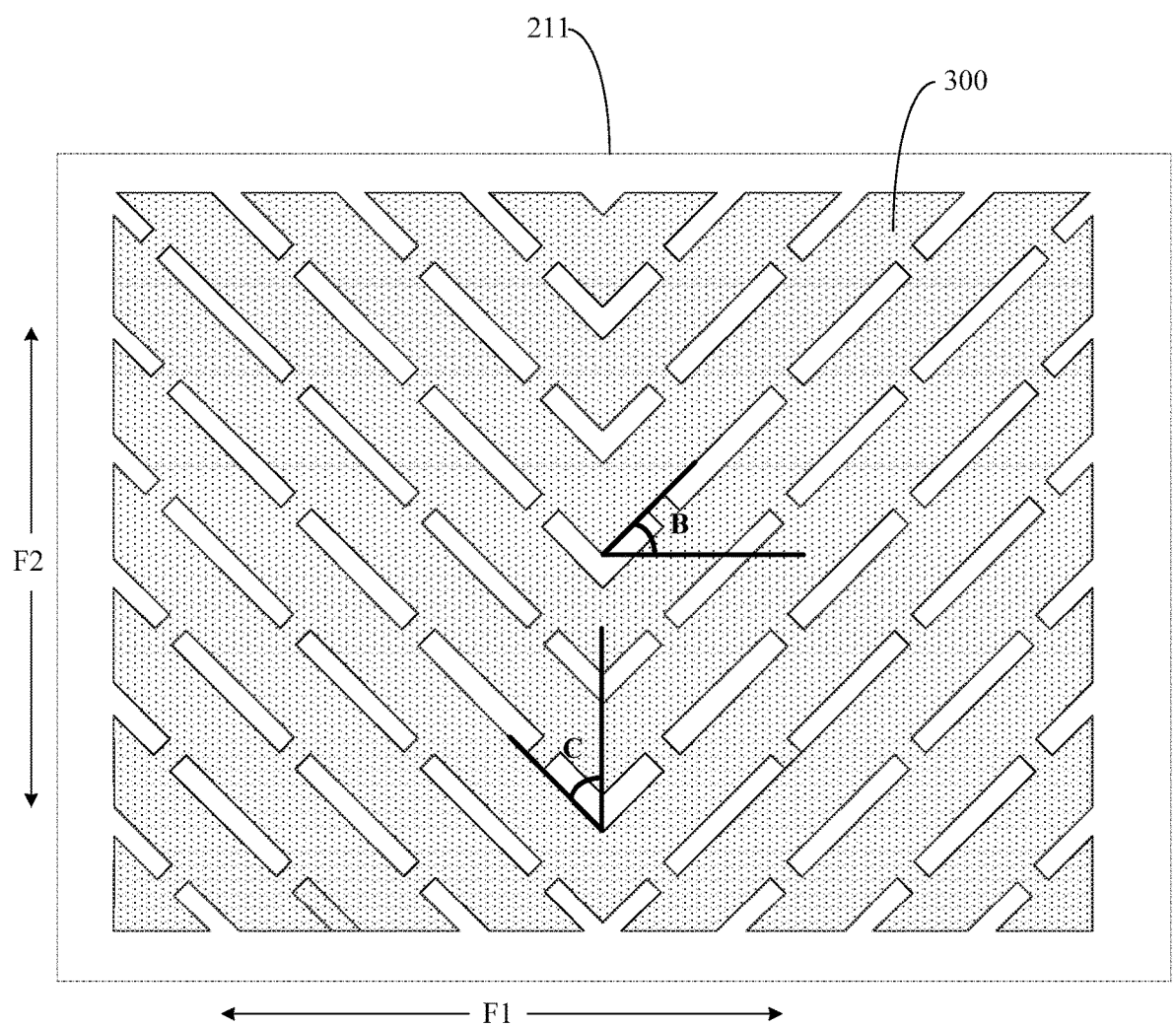
FIG. 6 is a schematic structural diagram in details of an area BB in the touch panel as illustrated in FIG. 1.

In a particular implementation, in the embodiments of this disclosure, as illustrated in FIG. 2A and FIG. 6, the pattern of the touch electrode section 300 is a diamond, and the angle between one side of the pattern of the touch electrode section 300 in the first sub-touch electrode 211, and one of the first direction F1 and the second direction F2 may range from 30 to 60 degrees to thereby avoid a molar strip from occurring on a display screen of a flexible display device.

As illustrated in FIG. 2A and FIG. 6, for example, the touch electrode section 300 is shaped like a diamond including four sides which are upper left and right sides, and lower left and right sides respectively.

The lower left and right sides of the touch electrode section 300 constitute a "V"-shaped electrode in which the angle C between the left side and the second direction F2 ranges from 30 to 60 degrees, and for example, the angle C may be set to 30 degrees, or may be set to 60 degrees so that the shape of the touch electrode section is a diamond. The angle B between the right side and the first direction F1 ranges from 30 to 60 degrees, and for example, the angle B may be set to 30 degrees, or may be set to 60 degrees so that the shape of the touch electrode section is a diamond.

In a particular implementation, in the embodiments of this disclosure, as illustrated in FIG. 4A, the pattern of the touch electrode section 300 is a rectangle, and the angle between one side of the pattern of the touch electrode section 300 in the first sub-touch electrode 211, and one of the first direction F1 and the second direction F2 is 90 degrees.

For example, the touch electrode section 300 is a rectangle including four sides which are an upper side, a lower side, a left side, and a right side respectively. The left side and the lower side of the touch electrode section 300 constitute an "L-shaped" electrode in which the angle D between the left side and the first direction F1 is 90 degrees, and the angle D between the lower side and the second direction F2 is 90 degrees. In this way, both the angle B and the angle C as illustrated in FIG. 6 may be set to 45 degrees so that the shape of the first sub-touch electrode 211 is a rectangle.

In order to lower the difficulty of the fabrication process, in a particular implementation, there may be the same pattern of the touch electrode sections 300 in the respective other first sub-touch electrodes 211 than the first sub-touch electrodes located at the ends of the first touch electrodes.

As illustrated in FIG. 1 and FIG. 2A, for example, the first sub-touch electrodes 211 located at the ends of the first touch electrodes may be arranged as a triangle so that the pattern of the touch electrode sections of the first sub-touch electrodes 211 located at the ends of the first touch electrodes may be arranged as a triangle, and the pattern of the other first sub-touch electrodes 211 may be arranged as a diamond so that the pattern of the touch electrode sections 300 of the other first sub-touch electrodes 211 may be arranged as a diamond.

Furthermore there may be the same pattern of the touch electrode sections in each first sub-touch electrode 211. As illustrated in FIG. 3 and FIG. 4A, for example, the pattern of each first sub-touch electrode 211 may be arranged as a rectangle so that the pattern of the touch electrode sections 300 in each first sub-touch electrode 211 may be arranged as a rectangle. Furthermore there may be the same orthographic projection of each first sub-touch electrode 211 onto the underlying substrate 100.

In order to lower the difficulty of the fabrication process, in a particular implementation, there may be the same pattern of the touch electrode sections 300 in the respective other second sub-touch electrodes 221 than the second sub-touch electrodes located at the ends of the second touch electrodes.

As illustrated in FIG. 1 and FIG. 2B, for example, the second sub-touch electrodes 221 located at the ends of the second touch electrodes may be arranged as a triangle so that the pattern of the touch electrode sections of the second sub-touch electrodes 221 located at the ends of the second touch electrodes may be arranged as a triangle, and the pattern of the other second sub-touch electrodes 221 may be arranged as a diamond so that the pattern of the touch electrode sections 300 of the other second sub-touch electrodes 221 may be arranged as a diamond.

Furthermore there may be the same pattern of the touch electrode sections in each second sub-touch electrode 221. As illustrated in FIG. 3 and FIG. 4B, for example, the pattern of each second sub-touch electrode 221 may be arranged as a rectangle so that the pattern of the touch electrode sections 300 in each second sub-touch electrode 221 may be arranged as a rectangle. Furthermore there may be the same orthographic projection of each second sub-touch electrode 221 onto the underlying substrate 100.

In a particular implementation, in the embodiments of this disclosure, for the respective other first sub-touch electrodes than the first sub-touch electrodes located at ends of the first touch electrodes, and the respective other second sub-touch electrodes than the second sub-touch electrodes located at the ends of the second touch electrodes, the pattern of the touch electrode sections in the respective other first sub-touch electrodes is the same as the pattern of the touch electrode sections in the respective other second sub-touch electrodes, to thereby avoid a molar strip from occurring on a display screen of a flexible display device.

As illustrated in FIG. 2A and FIG. 2B, for example, both the pattern of the touch electrode sections 300 in the first sub-touch electrodes 211, and the pattern of the touch electrode sections 300 in the second sub-touch electrodes 221 are arranged as a diamond. As illustrated in FIG. 3A and FIG. 3B, for example, both the pattern of the touch electrode sections 300 in the first sub-touch electrodes 211, and the pattern of the touch electrode sections 300 in the second sub-touch electrodes 221 are arranged as a rectangle.

In the embodiments of this disclosure, the respective first sub-touch electrodes and the respective second sub-touch electrodes include a plurality of annular touch electrode sections, and there is a gap between adjacent touch electrode sections. These touch electrode sections are integrally connected with each other through the connection sections so that there will be some spacing (i.e., the size of an opening) between the touch electrode sections to thereby release a stress so as to improve the capability of the electrodes to withstand bending, and to prevent the electrodes from being broken while being bent.

In a particular implementation, in the embodiments of this disclosure, a width of a gap between adjacent touch electrode sections is set between 20 micrometers and 30 micrometers. For example, the width of a gap between adjacent touch electrode sections may be set to 20 micrometers, or the width of a gap between adjacent touch electrode sections may be set to 25 micrometers, or the width of a gap between adjacent touch electrode sections may be set to 30 micrometers. Of course, the width of a gap between adjacent touch electrode sections may be set as needed in a real application environment, although the embodiment of this disclosure will not be limited thereto.

Figure 2C:
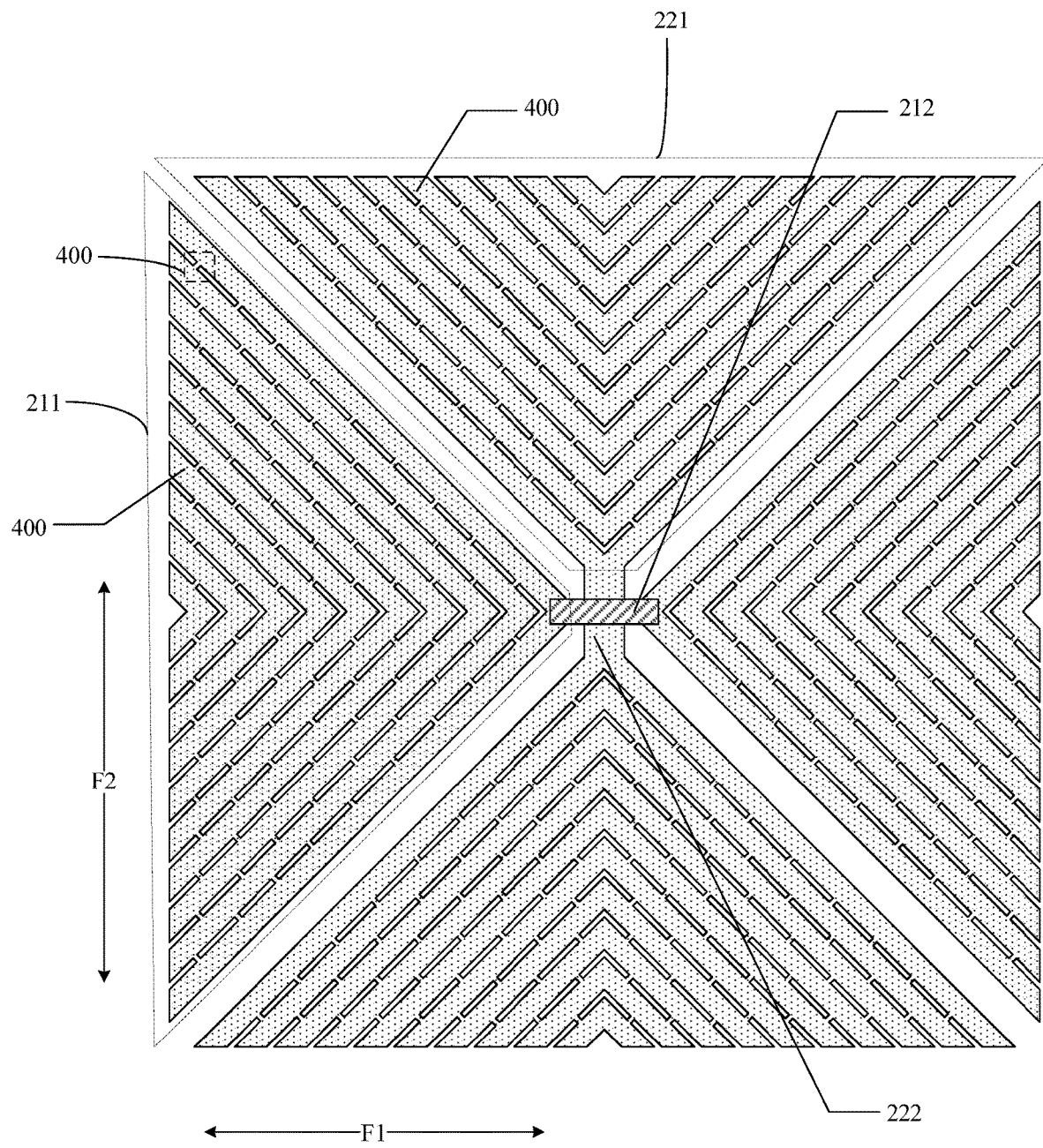
FIG. 2C is a first schematic structural diagram in details of an area AA in the touch panel as illustrated in FIG. 1.
Figure 4C:
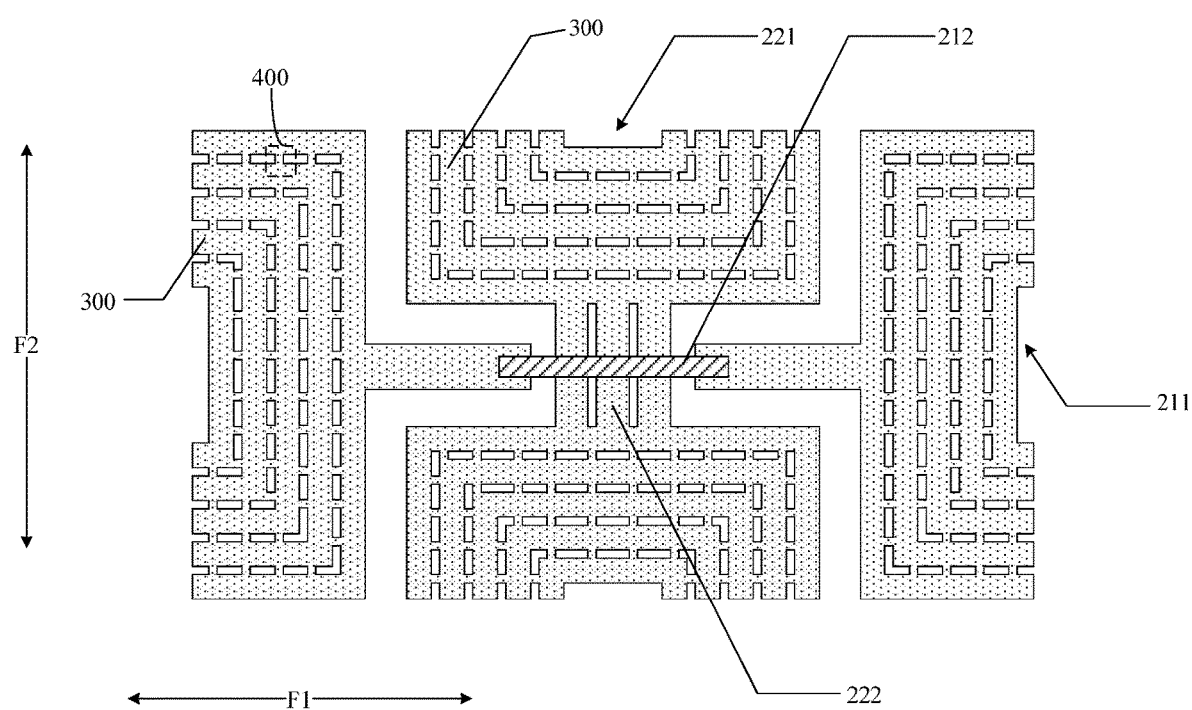
FIG. 4C is a schematic structural diagram in details of an area AA in the touch panel as illustrated in FIG. 3.

In a particular implementation, in the embodiments of this disclosure, as illustrated in FIG. 2C to FIG. 4C, the connection sections 400 may be distributed uniformly between every two adjacent touch electrode sections 300. Particularly as illustrated in FIG. 2C and FIG. 4C, the connection sections 400 may be distributed uniformly between every two adjacent touch electrode sections 300 in the first sub-touch electrodes 211 so that the gaps in the first sub-touch electrodes 211 may be arranged in order.

As illustrated in FIG. 2C and FIG. 4C, the connection sections 400 may be distributed uniformly between every two touch electrode sections 300 in the second sub-touch electrodes 221 so that the gaps in the second sub-touch electrodes 221 may be arranged in order. When these gaps arranged at an interval in order (or out of order) are applied to the touch panel, the effect of eliminating a shadow throughout the touch panel may be improved. Of course, alternatively the connection sections 400 between two adjacent touch electrode sections 300 may not be distributed uniformly so that the gaps may be arranged out of order, although the embodiment of this disclosure will not be limited thereto.

It shall be noted that FIG. 2C and FIG. 4C only illustrate possible implementations of the arrangement of the connection sections 400 of the first sub-touch electrodes and the second sub-touch electrodes in the embodiment of this disclosure, but the arrangement of the connection sections 400 will not be limited as illustrated in FIG. 2C and FIG. 4C. In a real application, when the connection sections 400 are arranged in order, adjacent gaps may be arranged in order in the same order, e.g., in a comb-tooth shape. In another example, when the connection sections 400 are arranged out of order, there may be different arrangement directions, depths, shapes, and sizes.

In a particular implementation, in the embodiment of this disclosure, gaps may be further arranged between adjacent touch electrodes 200. As illustrated in FIG. 2C, for example, gaps are arranged between the first touch electrodes 210 and the second touch electrodes 220 so that the first touch electrodes 210 are insulated from the second touch electrodes 220 by the gaps. Furthermore in a particular implementation, the width of a gap between adjacent touch electrodes 200 may be set as needed in a real application environment, although the embodiment of this disclosure will not be limited thereto.

Figure 8:
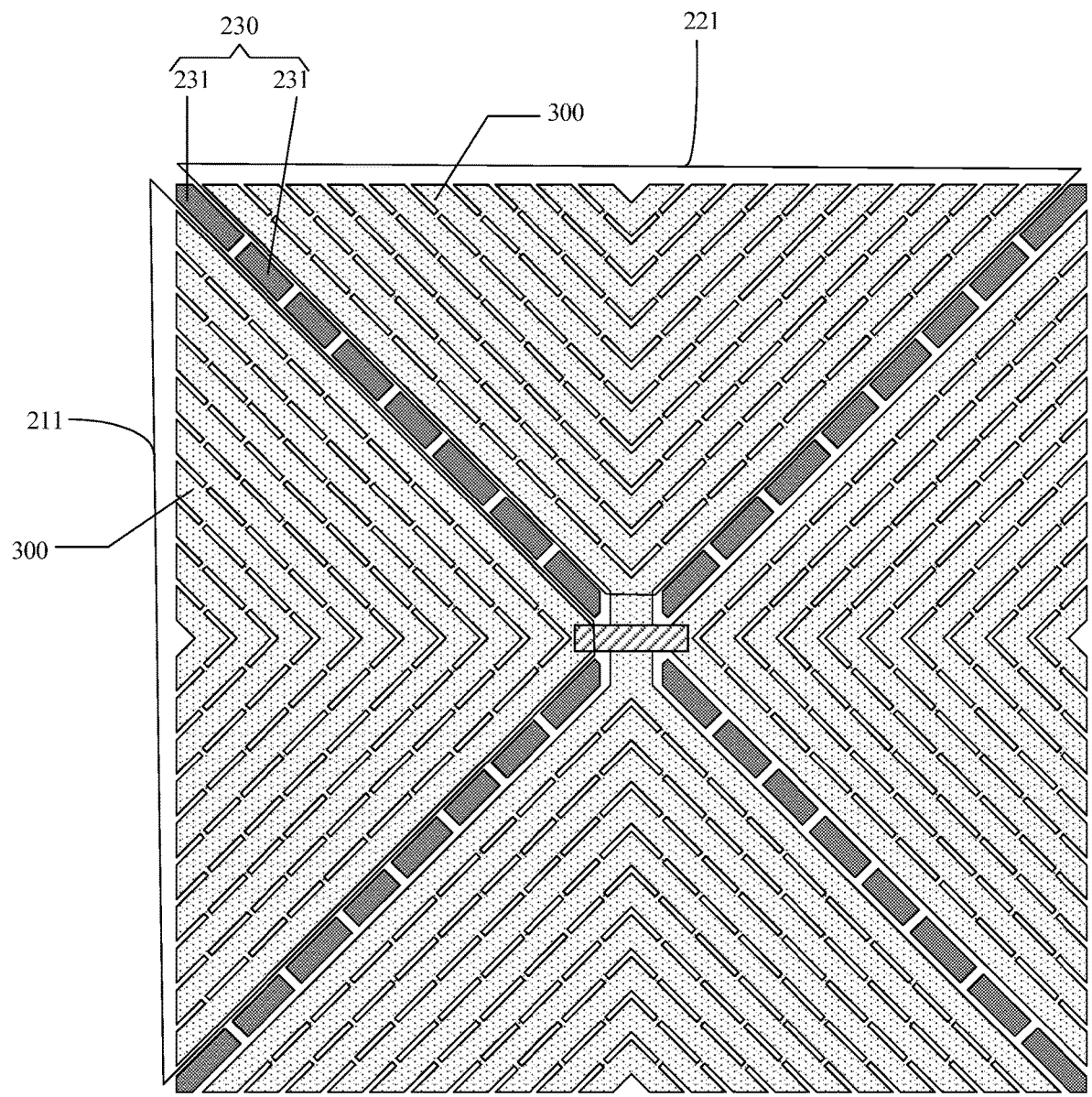
FIG. 8 is a third schematic structural diagram in details of the area AA in the touch panel as illustrated in FIG. 1.

In a particular implementation, in the embodiment of this disclosure, as illustrated in FIG. 8, the touch panel may further include dummy strip electrodes 230 arranged at the gaps between two adjacent touch electrodes 200, and these dummy strip electrodes are arranged to be insulated from the touch electrodes 200. The dummy strip electrodes are arranged at the gaps so that on one hand, the capability of the entire touch electrodes to withstand bending may be improved, and on the other hand, the effect of eliminating a shadow throughout the touch display may be improved in effect after the electrode pattern is formed.

In a particular implementation, in the embodiments of this disclosure, gaps are arranged between the touch electrodes and the adjacent dummy strip electrodes so that the touch electrodes are arranged to be insulated from the adjacent dummy strip electrodes 230.

Particularly in a particular implementation, a width of a gap between each touch electrode and an adjacent dummy strip electrode lies between 20 micrometers and 30 micrometers.

Figure 7:
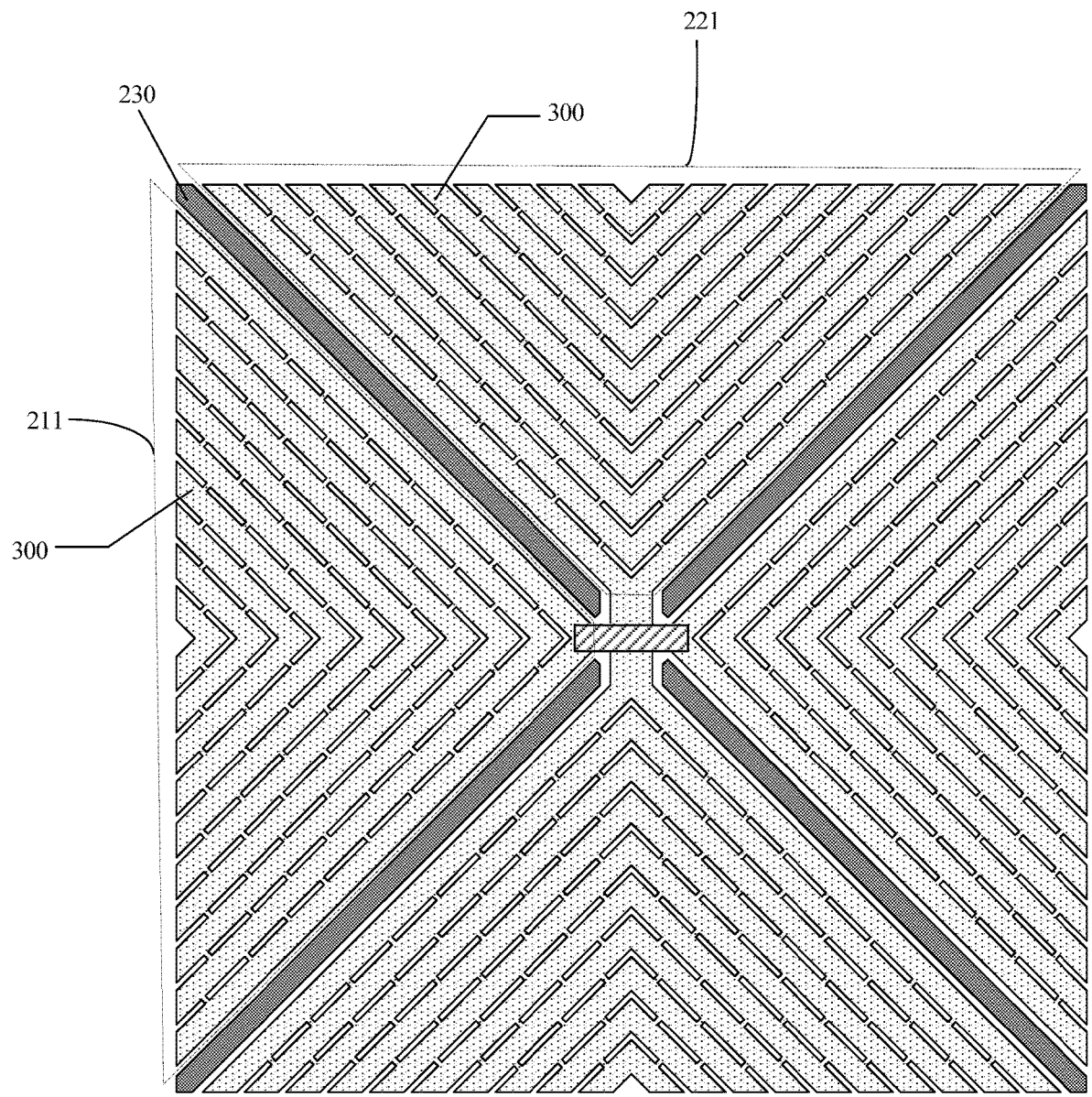
FIG. 7 is a second schematic structural diagram in details of the area AA in the touch panel as illustrated in FIG. 1.

For example, a width of a gap between a touch electrode and an adjacent dummy strip electrode is 20 micrometers. As illustrated in FIG. 7, for example, the width of the gap between the first sub-touch electrode 211 in the first touch electrode, and the adjacent dummy strip electrode 230 is 20 micrometers; and the width of the gap between the second sub-touch electrode 221 in the second touch electrode, and the adjacent dummy strip electrode 230 is 20 micrometers.

Alternatively a width of a gap between a touch electrode and an adjacent dummy strip electrode may be 25 micrometers. For example, the width of the gap between the first sub-touch electrode 211 in the first touch electrode, and the adjacent dummy strip electrode 230 is 15 micrometers; and the width of the gap between the second sub-touch electrode 221 in the second touch electrode, and the adjacent dummy strip electrode 230 is 15 micrometers.

Alternatively a width of a gap between a touch electrode and an adjacent dummy strip electrode may be 15 micrometers. For example, the width of the gap between the first sub-touch electrode 211 in the first touch electrode, and the adjacent dummy strip electrode 230 is 30 micrometers, and the width of the gap between the second sub-touch electrode 221 in the second touch electrode, and the adjacent dummy strip electrode 230 is 30 micrometers. Of course, the width of the gap between the touch electrode and the adjacent dummy strip electrode may be set as needed in a real application environment, although the embodiments of this disclosure will not be limited thereto.

In a particular implementation, in the embodiments of this disclosure, as illustrated in FIG. 7, a dummy strip electrode located at a gap between adjacent first and second sub-touch electrodes 211 and 212 may be structured integral; or as illustrated in FIG. 8, a dummy strip electrode 230 located at a gap between adjacent first and second sub-touch electrodes 211 and 212 may include a plurality of sub-dummy strip electrodes 231, so that the plurality of sub-dummy strip electrodes 231 may be combined into the dummy strip electrode 230.

Particularly each dummy strip electrode 230 may include a plurality of sub-dummy strip electrodes 231 arranged at an interval, and disconnected from each other, and these sub-dummy strip electrodes 231 arranged at an interval are arranged to extend along the gap. Furthermore in a particular implementation, two adjacent sub-dummy strip electrodes 231 may be connected through the connection sections. Of course, a particular implementation of the dummy strip electrodes 230 may be determined as needed in a real application environment, although the embodiment of this disclosure will not be limited thereto.

Furthermore as illustrated in FIG. 7 and FIG. 8, an extension direction of the dummy strip electrodes 230 extends in the same direction as the adjacent touch electrode sections 300 to thereby further improve the effect of eliminating a shadow in the touch panel 10.

In a particular implementation, in the embodiments of this disclosure, the dummy strip electrodes are arranged at the same layer as the touch electrodes. The respective electrodes above arranged at the same layer may be formed in a patterning process to thereby reduce the number of process operations, lower the cost of the process, and facilitate a reduction of the overall thickness of the touch panel.

In a particular implementation, in the embodiments of this disclosure, the edges of the touch electrode sections may be at least one of straight, curved, or folded, to thereby further improve the capability of the electrode to withstand bending, so as to prevent the electrode from being broken while being bent.

Figure 9:
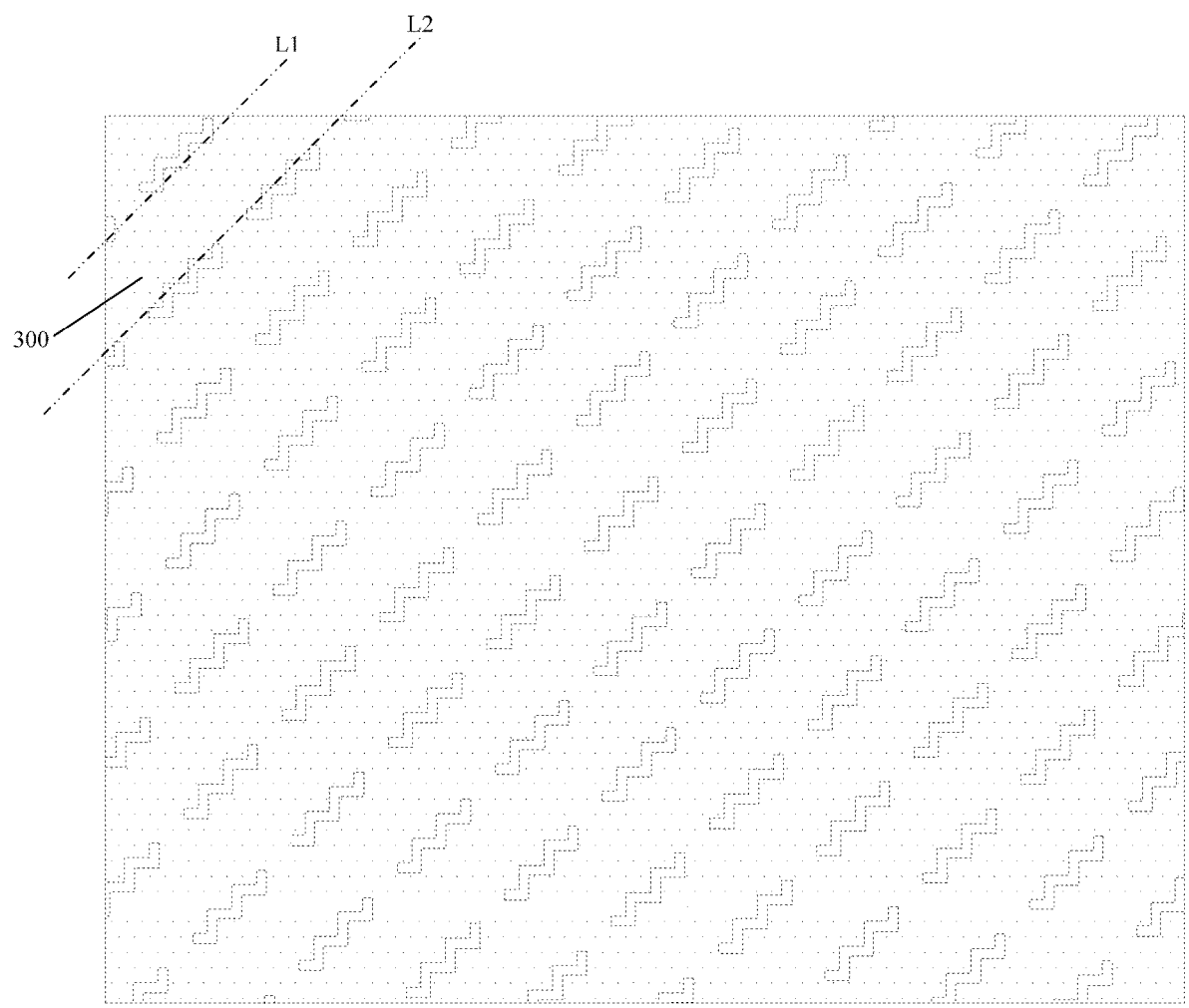
FIG. 9 is a partial schematic structural diagram of a touch electrode section according to some embodiments of this disclosure.

Particularly in the embodiments of this disclosure, the respective touch electrode sections as illustrated in FIG. 1 to FIG. 8 include straight edges, for example. As illustrated in FIG. 9, for example, folded edges of the touch electrode sections 300 may alternatively be arranged. Of course, folded edges of the touch electrode sections 300 may alternatively be arranged. In a real application, the shape of the edges of the touch electrode sections 300 may be determined as needed in a real application environment, although the embodiment of this disclosure will not be limited thereto.

In a particular implementation, the edges of the touch electrode sections in each first sub-touch electrode may be of the same type. For example, the edges of the touch electrode sections in each first sub-touch electrode may be straight or folded or curved as illustrated above. Of course, the edges of the touch electrode sections in each first sub-touch electrode may alternatively be of more than one type, and for example, the edges of a part of the touch electrode sections in each first sub-touch electrode are straight, the edges of a part of the touch electrode sections are folded, and the edges of the other touch electrode sections are curved.

In a particular implementation, the edges of the touch electrode sections in each second sub-touch electrode may be of the same type. For example, the edges of the touch electrode sections in each second sub-touch electrode may be straight or folded or curved as illustrated above. Of course, the edges of the touch electrode sections in each second sub-touch electrode may alternatively be of more than one type, and for example, the edges of a part of the touch electrode sections in each second sub-touch electrode are straight, the edges of a part of the touch electrode sections are folded, and the edges of the other touch electrode sections are curved.

Figure 10:
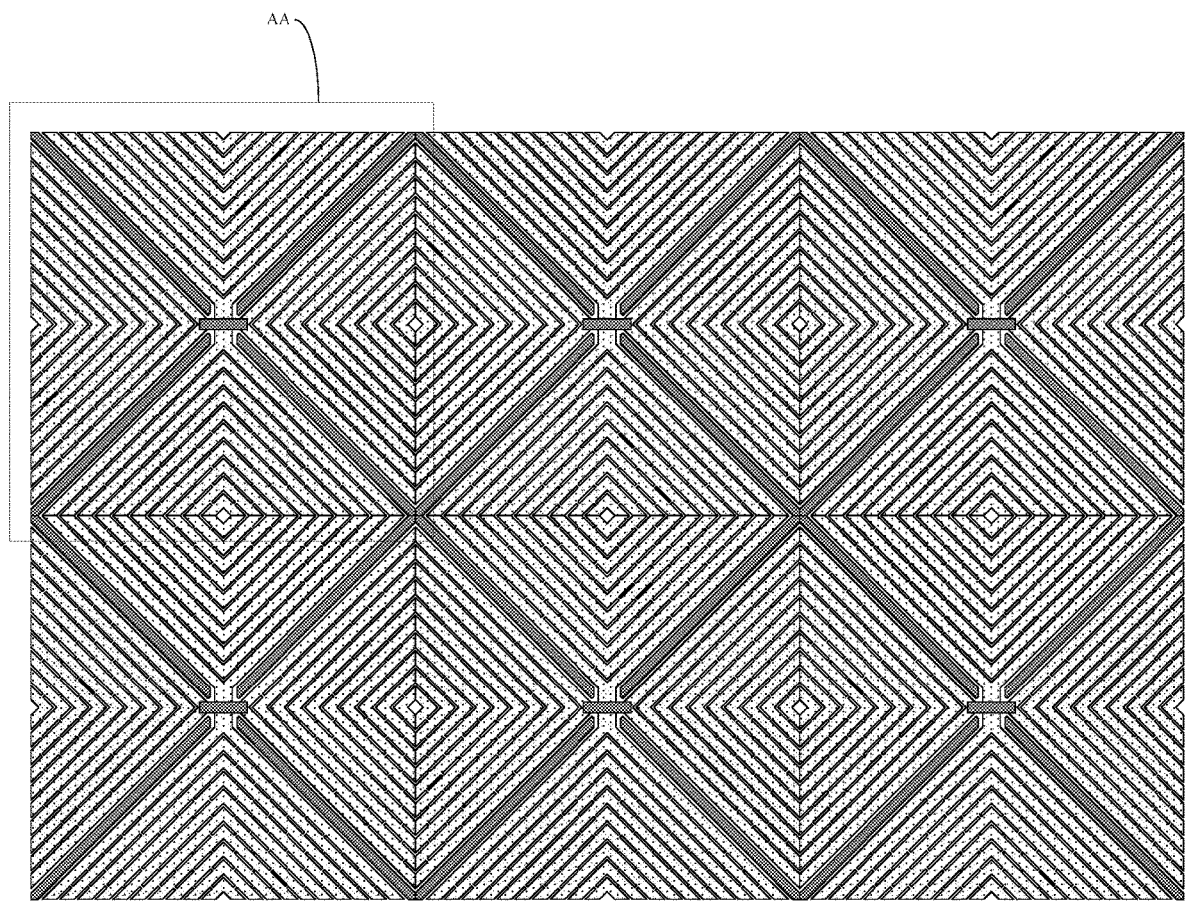
FIG. 10 is a schematic structural diagram of spliced touch elements in a touch panel according to some embodiments of this disclosure.

In a particular implementation, in the embodiments of this disclosure, the first sub-touch electrodes and the second sub-touch electrodes may be formed in a splicing manner. As illustrated in FIG. 1, FIG. 2C, and FIG. 10, for example, a touch element AA may be the smallest spliced unit, so that a plurality of touch elements AA arranged in an array, and formed in the same structure may be arranged on the underlying substrate 100 to form the respective touch electrodes.

For example, the touch elements are spliced so that the first sub-touch electrodes in the first touch electrodes include a plurality of annular touch electrode sections arranged at an interval, and the touch elements are spliced so that the second sub-touch electrodes in the second touch electrodes include a plurality of annular touch electrode sections arranged at an interval.

In a particular implementation, the touch elements AA typically may be designed as a rectangle (e.g., an oblong or a square) so that the touch area of the touch panel according to the embodiment of this disclosure may be formed by arranging the touch elements AA in the respective embodiments above of this disclosure in an array, where the electrode pattern throughout the touch panel is formed with the touch elements AA being elementary units.

Moreover in order to apply the touch elements AA above to the touch panel 10, in the embodiments of this disclosure, the first sub-touch electrodes and the second sub-touch electrodes in the touch elements AA will not be limited to any particular shapes, but they particular shapes may be determined as needed in a real application environment.

For example, the first sub-touch electrodes and the second sub-touch electrodes in the touch elements AA may be arranged as a combination of a triangle, a trapezium, or a combination thereof, although the embodiment of this disclosure will not be limited thereto.

Furthermore since the touch elements AA in the embodiments of this disclosure are to be arranged in an array to form the electrode pattern throughout the touch panel, in an implementation of the embodiments of this disclosure, the touch elements AA shall be arranged in an array in such a way that the first sub-touch electrodes 211 of the touch elements AA adjacent in the first direction may be spliced accurately, and the second sub-touch electrodes 221 of the touch elements AA adjacent in the second direction may be spliced accurately, so the electrode pattern may be designed so that the first sub-touch electrodes 211 are arranged in a symmetric structure with the middle lines of the first sub-touch electrodes 211 in the first direction being a symmetry axis, and the second sub-touch electrodes 221 are arranged in a symmetric structure with the middle lines of the second sub-touch electrodes 221 in the second direction being a symmetry axis.

Optionally in the embodiments of this disclosure, the aspect ratio of a touch element AA may be scaled in proportion, and the length of a side of the touch element AA ranges from 2 to 10 millimeters.

For example, when high touch sensitivity is required of the touch panel, the size of the touch element AA may be set to 2 mm*2 mm; and when the touch panel has a large size, and low touch sensitivity is required of the touch panel, the size of the touch element AA may be set to 10 mm*10 mm. The electrode pattern in the touch element AA may be designed without redesigning the electrode pattern of the touch element AA, where the touch element with the size of 2 mm*2 mm may simply be scaled up in proportion by a factor of 5 to the touch element with the size of 10 mm*10 mm.

In the embodiments of this disclosure, the touch elements AA are a rectangular integral structure, and the first sub-touch electrodes 211 and the second sub-touch electrodes 221 are triangular structures, so the first connection lines 212 electrically connect the left first sub-touch electrodes 211 with the right second sub-touch electrodes 221, and the second connection lines 222 electrically connect the upper first sub-touch electrodes 221 with the lower second sub-touch electrodes 221. Moreover these triangular sub-electrodes typically may be designed as an isosceles triangle.

It shall be noted that in the touch element AA as illustrated in FIG. 2C, each first sub-touch electrode 211 and each second sub-touch electrode 221 are electrically connected through another area or structure, so each first sub-touch electrode 211 and each second sub-touch electrode 221 are not a standard triangle, but may be regarded in structure as a triangle as a whole, that is, these sub-electrodes may be referred to as triangular sub-electrodes.

In an application scenario of the embodiments of this disclosure, when the touch element AA is a square, each triangular sub-electrode may be a symmetric structure with a diagonal of the square being a symmetry axis, or the middle line thereof being a symmetry axis, and the electrode pattern in the touch element AA (i.e., each triangular sub-electrode) is a symmetric structure. FIG. 2C illustrates the structure of the touch element AA as a square as a whole, where any two sub-electrodes are an electrode pattern in a symmetric structure, for example.

In the embodiments of this disclosure, each sub-electrode includes a plurality of openings arranged at an interval, and the openings arranged at an interval in each sub-electrode divide the sub-electrode into a plurality of strip electrodes arranged at an interval; and as illustrated in FIG. 2 and FIG. 3, openings in a sub-electrode divide the sub-electrode into a plurality of strip electrodes arranged in order at an interval, and as can be apparent, the strip electrodes in each sub-electrode are not an integral pattern, but are connected to form an integral electrode pattern.

Optionally in the embodiments of this disclosure, in the touch element AA as illustrated in FIG. 3C, the electrode pattern in each triangular sub-electrode may be arranged as a plurality of "V-shaped" electrodes arranged at an interval. Each "V-shaped" electrode includes two strip electrodes connected at the tip of the V shape. The two strip electrodes are parallel respectively to the sides of the triangular sub-electrode including the "V-shaped" electrode, which are adjacent to the other triangular sub-electrodes, and adjacent "V-shaped" electrodes are connected through at least one connection section arranged at an interval so that the strip electrodes in each triangular sub-electrode are connected in an integral structure.

Moreover in the touch element AA, the "V-shaped" electrodes in the first sub-touch electrodes 211 are formed in a symmetric structure with the middle line of the touch element AA in the first direction F1 being a symmetry axis, and the "V-shaped" electrodes in the second sub-touch electrodes 221 are formed in a symmetric structure with the middle line of the touch element AA in the second direction F2 being a symmetry axis.

In the embodiment of this disclosure, in the triangular sub-electrode structure, the strip electrodes in the first sub-touch electrode may be arranged as "V-shaped" strip electrodes, and these "V-shaped" electrodes are arranged to overlap with each other in a semi-wrapped form.

As illustrated in FIG. 2C, a "V-shaped" electrode includes two left and right strip electrodes constituting the "V-shaped" electrode, and of two electrodes constituting a "V-shaped" electrode in a first sub-touch electrode 211 as illustrated in FIG. 2C, the left electrode is parallel to the side of the first sub-touch electrode 211 adjacent to a second sub-touch electrode 221, and the right electrode is parallel to the side of the first sub-touch electrode 211 adjacent to another second sub-touch electrode 221; and adjacent "V-shaped" electrodes may be connected through a plurality of connection sections arranged at an interval.

Optionally in the embodiments of this disclosure, the angle between a strip electrode and the first direction (or the second direction) ranges from 30 to 60 degrees. As illustrated in FIG. 2C and FIG. 6, there is an angle between both left and right strip electrodes in a "V-shaped" electrode, and the first direction (or the second direction), where the angle is fixed between 30 and 60 degrees. When the shape of a touch element AA is fixed (e.g., a square), and the shape of a triangular sub-electrode is fixed (e.g., an equilateral triangle), both the angle B (the angle between a strip electrode and the first direction F1) and the angle C (the angle between the strip electrode and the second direction F2) as illustrated in FIG. 6 are 45 degrees.

Since the electrode pattern in the touch panel according to the embodiments of this disclosure is formed of the touch elements AA arranged in an array, a diamond electrode pattern may be formed in the touch panel due to the limited range of the angles. As illustrated in FIG. 6 which particularly illustrates six touch elements AA in an array, the electrodes are arranged as "V-shaped" electrodes, the triangular sub-electrodes are composed of a plurality of "V-shaped" electrodes, and the range of the angles between the two left and right electrodes in the "V-shaped" electrode, and the first direction (or the second direction) is limited, so that a molar strip may be avoided in effect from occurring on a display screen of a flexible display device.

It shall be noted that in the embodiments as illustrated in FIG. 6, the angle between the strip electrode and the first direction (or the second direction) is 45 degrees. If the touch element AA is an oblong, then when the width to length ratio of the oblong is fixed, and the shape of the triangular sub-electrode is determined, the angle between the strip electrode and the first direction (or the second direction) will lie between 30° and 60°. For example, the angle between the strip electrode and the first direction may be 30°, and the angle between the strip electrode and the second direction may be 60°.

It shall be noted that in the embodiments of this disclosure, the patterning process may include only a photolithograph process, or may include a photolithograph and an etching operation, and may also include printing, ink-jetting, and other processes for forming a predetermined pattern. The photolithograph process refers to a process for forming a pattern using photo-resist, a mask, an exposure machine, etc., where the process includes film formation, exposure, development, and other processes. In a particular implementation, a corresponding patterning process may be selected according to the structure formed in the embodiments of this disclosure.

It shall be noted that in a particular implementation, a user may perform a touching operation on a flexible display screen including the touch panel according to the embodiment of this disclosure, and for example, the touch panel may be fit on the flexible display screen using a fitting technology. The existing screen structure typically includes protective glass, a touch panel, and a display screen from the top to the bottom in that order, and there are various fitting technologies, e.g., One Glass Solution (OGS), GFF, G1F, G2F, GF, etc., in which there are different numbers of films, numbers of electrode layers of traverse and longitudinal electrodes, or relative hierarchical positions of traverse and longitudinal electrodes opposite to the films.

Figure 15:
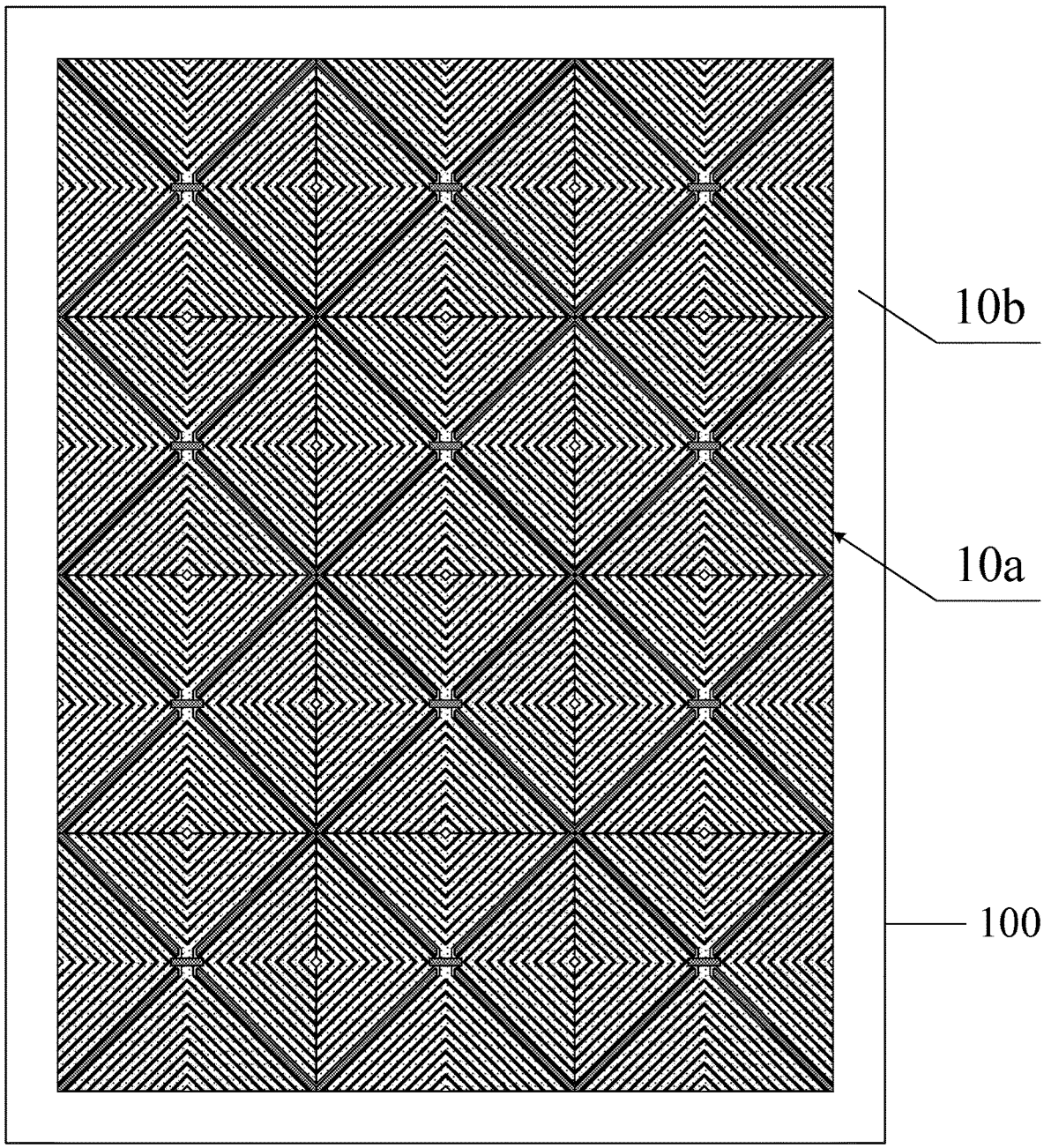
FIG. 15 is a schematic structural diagram of a touch panel fabricated using the method for fabricating a touch panel according to some embodiments of this disclosure.

In a particular implementation, as illustrated in FIG. 15, the underlying substrate 100 includes a touch area 10a and a non-touch area 10b. The touch electrodes are arranged in the touch area 10a, and some traveling lines may be arranged in the non-touch area 10b. Furthermore the touch area of the touch panel may correspond to the display area of the display screen. For example, an orthographic projection of the touch area onto the display screen overlaps with the display area.

In a particular implementation, the touch panel according to the embodiments of this disclosure may support an active pen, a passive pen, and other various touch operations, and the pattern of the touch electrodes are formed of the plurality of touch electrode sections arranged in order in an annular manner instead of the integral electrode pattern in the existing touch panel. Each first sub-touch electrode and each second sub-touch electrode may be electrically connected through the connection sections (i.e., electrically conductive blocks) arranged at an interval. The width of a gap between adjacent touch connection sections in the same first sub-touch electrode and second sub-touch electrode ranges from 20 to 30 millimeters. Furthermore the touch electrode sections in the first sub-touch electrode and the second sub-touch electrode are arranged in order, connected in a diamond electrode pattern, and distributed uniformly so that the effect of eliminating a shadow throughout the touch panel may be further improved.

Figure 11:
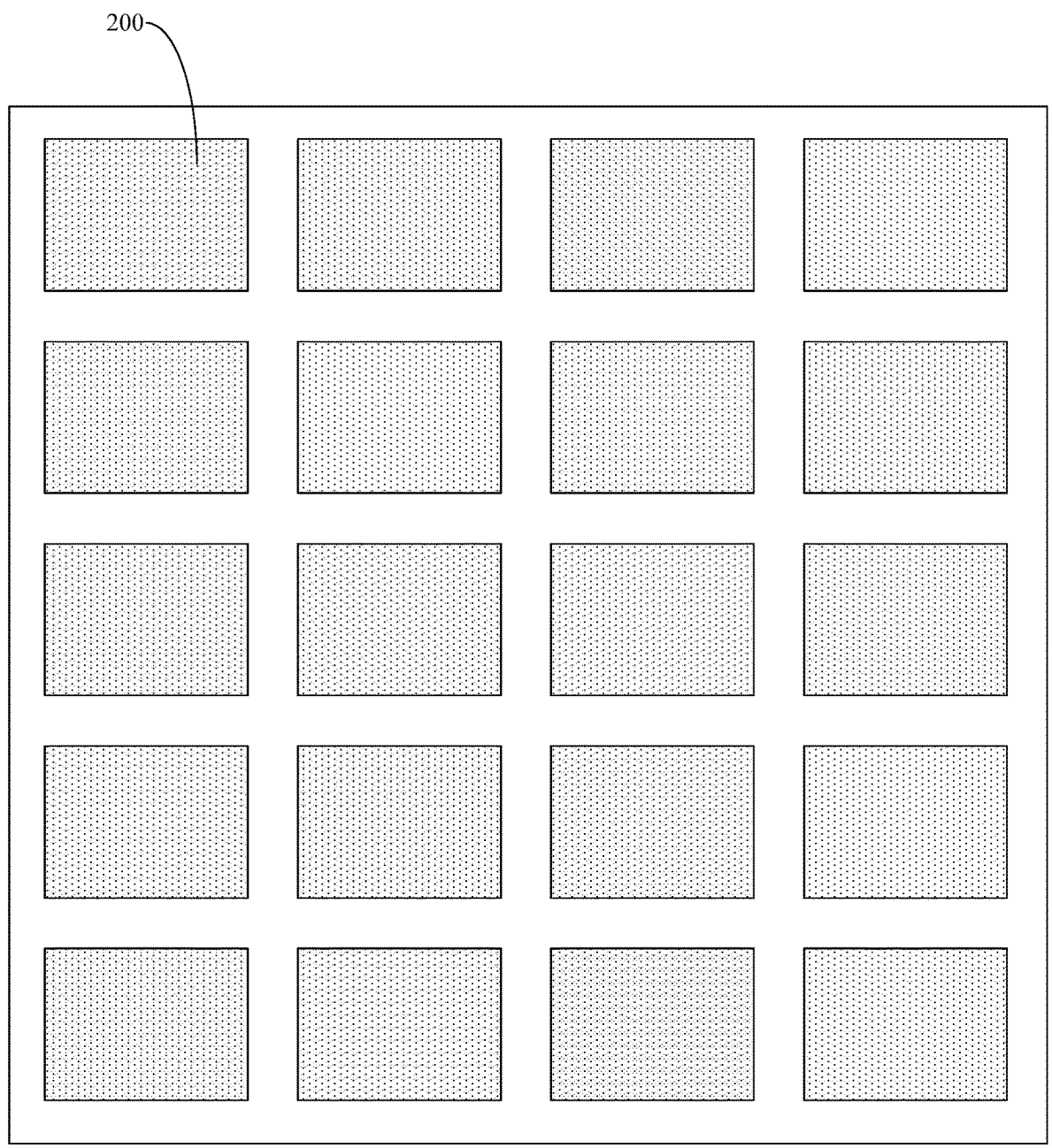
FIG. 11 is a third schematic structural diagram of a touch panel according to some embodiments of this disclosure.

Some embodiments of this disclosure provide a touch panel structure as illustrated in FIG. 11, which is a variation of the embodiment above of this disclosure. Only the differences of this embodiment from the embodiment above will be described, so a repeated description of their commonalities will be omitted here.

Figure 12:
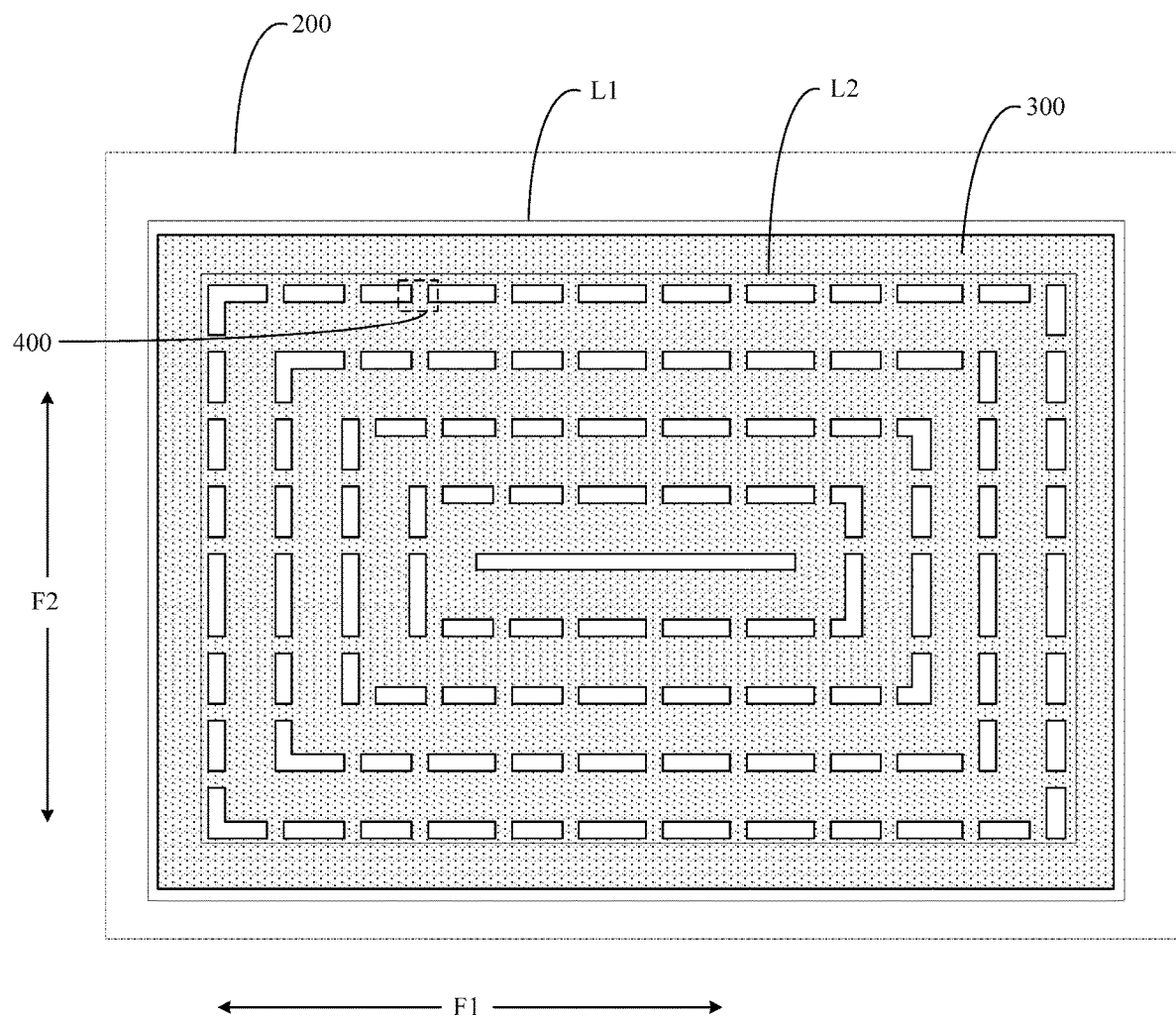
FIG. 12 is a schematic structural diagram of a touch electrode as illustrated in FIG. 11.

In a particular implementation, in the embodiment of this disclosure, as illustrated in FIG. 11 and FIG. 12, the plurality of touch electrodes 200 may include self-capacitive electrodes arranged in an array. Each touch electrode 200 includes a plurality of annular touch electrode sections 300 arranged at an interval. Furthermore every two adjacent touch electrode sections 300 in the same touch electrode 200 are electrically connected through a plurality of connection sections 400 so that the touch panel may perform a touch function under the self-capacitive principle. FIG. 12 illustrates a touch electrode section 300 in an area between the dotted box L1 and the dotted box L2, and a connection section 400 in an area surrounded by the dotted box 400.

Furthermore in a particular implementation, in the embodiment of this disclosure, the respective self-capacitive electrodes are arranged at the same layer so that the respective self-capacitive electrodes may be patterned in a patterning process to thereby simplify the fabrication process, save the production cost, and improve the production efficiency.

Based upon the same inventive idea, some embodiments of this disclosure further provide a touch display device which may include the touch panel according to any one of the embodiments above of this disclosure. The touch display device may address the problem under a similar principle to the touch panel above, so reference may be made to the implementation of the touch panel above for an implementation of the touch display device, so a repeated description thereof will be omitted here.

In a particular implementation, the touch display device according to the embodiment of this disclosure may be a mobile phone, a tablet computer, a TV set, a monitor, a notebook computer, a digital photo frame, a navigator, or any other product or component with display and touch functions. All the other indispensable components to the touch display device shall readily occur to those ordinarily skilled in the art, so a repeated description thereof will be omitted here, and this disclosure will not be limited thereto. Furthermore reference may be made to the touch panel according to the embodiments above of this disclosure for an implementation and advantageous effects of the touch display device, so a repeated description thereof will be omitted here.

Based upon the same inventive idea, some embodiments of this disclosure further provides a method for fabricating the touch panel according to any one of the embodiments above of this disclosure.

The method for fabricating the touch panel according to the embodiment of this disclosure may include the operation of: forming a pattern of the respective touch electrode in a touch area of the underlying substrate, where the pattern of the touch electrodes is the pattern of the touch electrodes according to any one of the embodiments as illustrated in FIG. 1 to FIG. 12.

Figure 13:
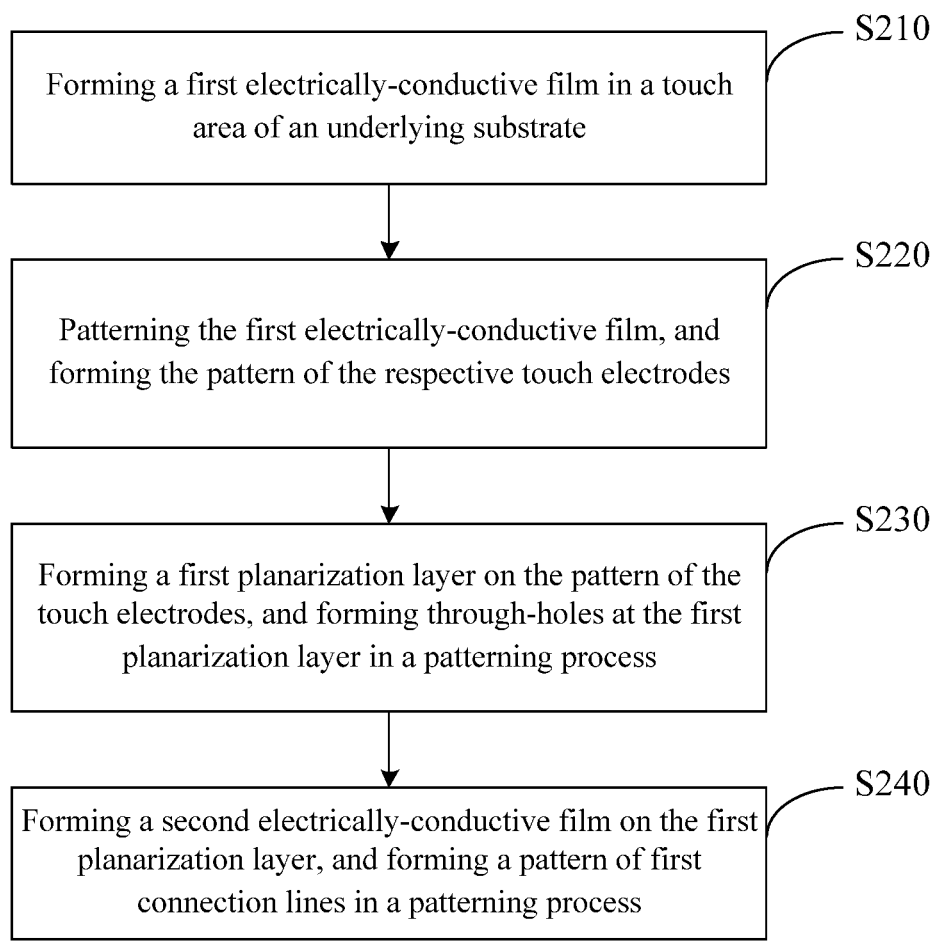
FIG. 13 is a first flow chart of a method for fabricating a touch panel according to some embodiments of this disclosure.

In a particular implementation, as illustrated in FIG. 13, the method for fabricating the touch panel according to the embodiments of this disclosure particularly may include the following operations.

The operation S210 is to form a first electrically-conductive film in a touch area 10a of an underlying substrate 100.

The operation S220 is to pattern the first electrically-conductive film, and to form the pattern of the respective touch electrodes. The pattern of the touch electrodes is the pattern of the touch electrodes according to any one of the embodiments as illustrated in FIG. 1 to FIG. 12.

The operation S230 is to form a first planarization layer on the pattern of the touch electrodes, and to form through-holes at the first planarization layer in a patterning process. The bridging through-holes are arranged on two first sub-touch electrodes of each first touch electrode, which are spaced by each second touch electrode.

The operation S240 is to form a second electrically-conductive film on the first planarization layer, and to form a pattern of first connection lines in a patterning process.

Particularly in the touch panel fabricated using touch elements AA arranged in an array, the touch elements in any one of the embodiments above of this disclosure are elementary units, and are arranged in an array to form the electrode pattern.

In the embodiments of this disclosure, the touch panel to be fabricated is structured with a single film, and the respective touch electrodes are arranged at the same electrode layer. For example, the first touch electrodes and the second touch electrodes are arranged at the same electrode layer, that is, they are formed in the same photolithograph and etching processes, and for example, the first electrically-conductive film is an ITO film which may be formed on a sensing film which is a Cyclo Olefin Polymer (COP) film, where the ITO film may be patterned by applying photo-resist to the ITO film, exposing and developing the photo-resist, and forming alignment marks on the ITO film; and for example, Photo-Resist (PR) is applied, developed to form the electrode pattern in the touch panel according to the embodiments above of this disclosure, and finally etched, and the remaining photo-resist is stripped away.

The electrode pattern formed in the operations above is the same as the pattern of the touch electrodes in the touch panel according to the embodiments above of this disclosure, so the pattern of the touch electrodes formed in the method according to the embodiment of this disclosure has the same performance as the pattern of the touch electrodes in the embodiments above of this disclosure, that is, the pattern of the touch electrodes has a good capability to withstand bending, so the touch panel may be prevented in effect from being broken while being bent.

It shall be noted that in the embodiments of this disclosure, the first sub-touch electrodes in the first touch electrodes are still a separate electrode pattern instead of structurally integral first touch electrodes after the operation S220 is performed, so the bridge structures of the first connection lines for connecting the first sub-touch electrodes may be formed in a subsequent process to form the structurally and functionally integral first touch electrodes.

In the embodiments of this disclosure, the first planarization layer is formed on the formed electrode pattern (i.e., the first sub-touch electrodes and the second sub-touch electrodes), where the first planarization layer is an organic insulation layer denoted as an OC1 layer, for example, and the through-holes may be formed at the OC1 layer by applying photo-resist to the OC1 layer, exposing and developing the photo-resist in a patterning process, where the bridge points of the bridge structures of the first connection lines are formed using the through-holes, the through-holes are arranged on two first sub-touch electrodes in the first touch electrode, which are spaced by the second touch electrode, and located at the positions of these two first sub-touch electrodes the closest to the second touch electrode, as illustrated in FIG. 1 to FIG. 8.

After the through-holes are formed, a second electrically-conductive film is formed on the OC1 layer, where the second electrically-conduct may also be an ITO layer which may be formed in a sputtering process, for example, the bridge structures of the first connection lines may be formed using the ITO layer, and the ITO layer may be patterned by applying photo-resist to the ITO layer, exposing, developing, etching, stripping, etc., the photo-resist to form the bridge structures made of ITO.

The touch panel fabricated in the process above according to the embodiment of this disclosure has the same structure and performance as the touch panel according to the embodiments above of this disclosure, that is, the first touch electrodes and the second touch electrodes are formed at the same layer (the first touch electrodes formed here only include the first sub-touch electrodes), the first sub-touch electrodes are connected using the bridge structures of the first connection lines to form the structurally and functionally integral first touch electrodes, and both the electrodes and the first connection lines are made of ITO, so the touch panel has the same advantageous effects as the touch panel according to the embodiments above of this disclosure, and a repeated description thereof will be omitted here.

Figure 14:
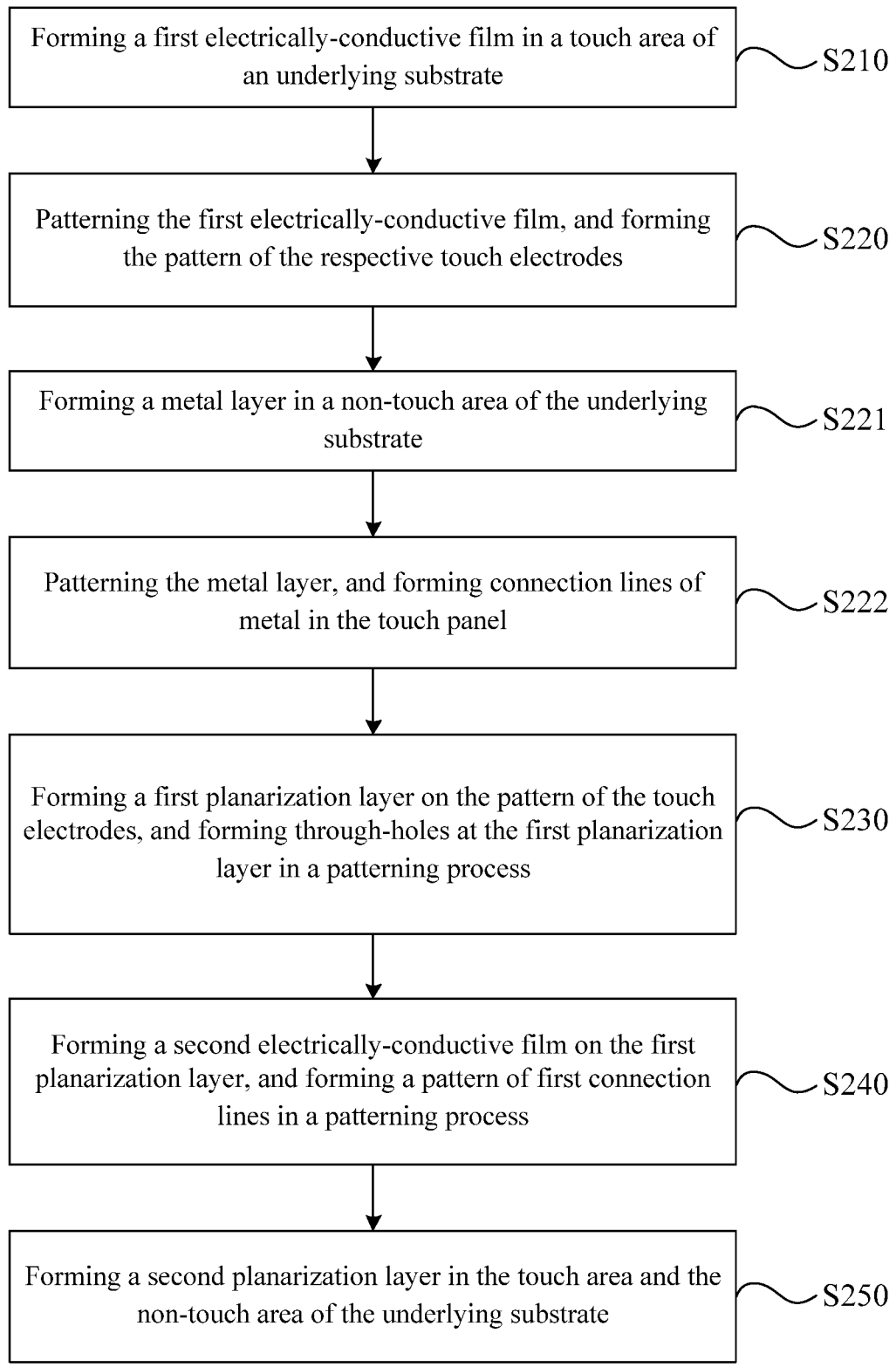
FIG. 14 is a second flow chart of a method for fabricating a touch panel according to some embodiments of this disclosure.

Optionally FIG. 14 illustrates a flow chart of another method for fabricating a touch panel according to some embodiments of this disclosure. Further to the flow as illustrated in FIG. 13, before the operation S230, the method according to the embodiment of this disclosure may further include the following operations.

The operation S221 is to form a metal layer in a non-touch area of the underlying substrate.

The operation S222 is to pattern the metal layer, and to form connection lines of metal in the touch panel.

In the method for fabricating the touch panel according to the embodiment of this disclosure, before the OC1 layer is formed, the connection lines of metal may be formed in the non-touch area of the underlying substrate, where the connection lines of metal include connection lines for connecting the first touch electrodes and the second touch electrodes with a Flexible Printed Circuit (FPC), and connection lines in a bonding area for bending the FPC to conduct a signal.

Moreover in the embodiment of this disclosure, the patterning process is performed on the OC1 layer in the operation S230 by forming the through-holes at the OC1 layer, but also forming a hollow pattern of the bonding area in the non-touch area of the touch panel so that the ITO film is sprayed at the position of the hollow pattern in the bonding area in the operation S240 to overlie the connection lines of metal in the bonding area so as to protect the connection lines of metal from being eroded.

Optionally in the embodiment of this disclosure, after the operation S240, the method may further include: the operation S250 is to form a second planarization layer in the touch area and the non-touch area of the underlying substrate.

Figure 16:
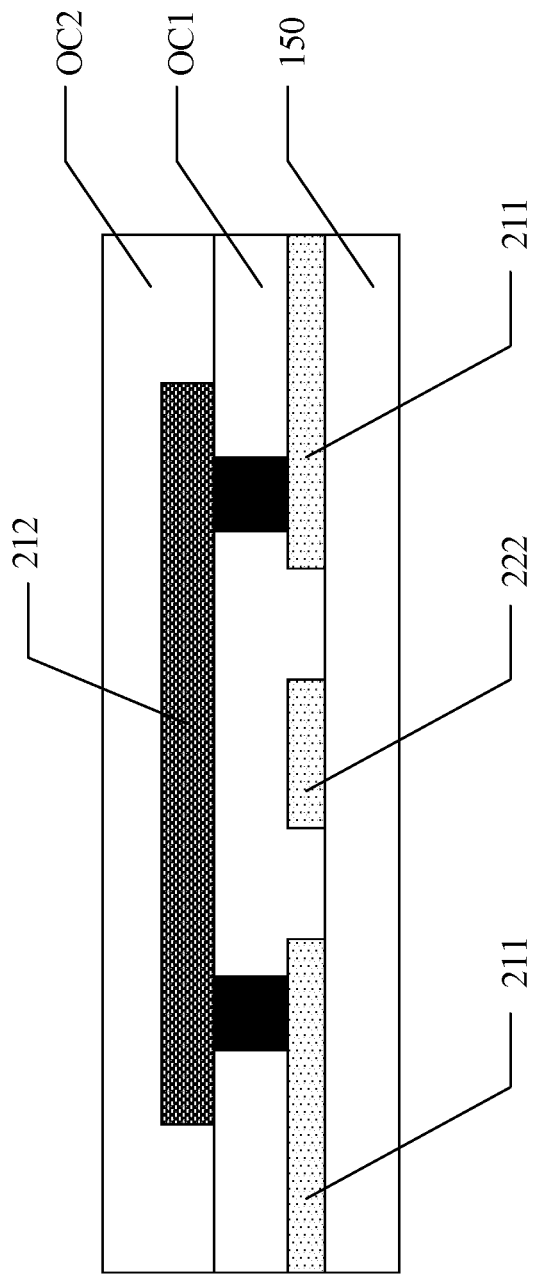
FIG. 16 is a schematic structural diagram of a part of a touch panel according to some embodiments of this disclosure in a sectional view.

In the embodiment of this disclosure, the second planarization layer is formed in the touch area above the bridge structures and the OC1 layer, where the second planarization layer is also an organic insulation layer denoted as OC2, for example, to protect the entire touch panel. FIG. 15 illustrates a schematic structural diagram of the touch panel fabricated using the method for fabricating the touch panel according to the embodiment of this disclosure, and FIG. 16 illustrates a sectional view of the touch panel at a bridge structure, where the touch electrodes (including the first sub-touch electrodes 211 in the first touch electrodes, and the second sub-touch electrodes 221 in the second touch electrodes) are formed on the flexible substrate 150, and each first connection line 212 electrically connects two adjacent first sub-touch electrodes 211, where FIG. 16 illustrates a second connection line 222 below the first connection line 212.

Optionally in a particular implementation, forming the pattern of the respective touch electrodes in the touch area of the underlying substrate particularly may include forming the pattern of the respective self-capacitive electrodes in the touch area of the underlying substrate.

In the touch panel and the touch display device according to the embodiment of this disclosure, the touch electrodes include a plurality of annular touch electrode sections arranged at an interval, and every two adjacent touch electrode sections in the same touch electrode are electrically connected through a plurality of connection sections, so that gaps may be arranged between the touch electrode sections, so there is some spacing (i.e., the size of a gap) between the annular touch electrode sections spaced by the gaps to thereby release a stress so as to improve the capability of the electrodes to withstand bending, and to prevent the electrodes from being broken while being bent.

Evidently those skilled in the art may make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A touch panel, comprising:
   an underlying substrate; and
   a plurality of touch electrodes arranged on the underlying substrate, and insulated from each other;
   wherein
   at least one of the plurality of touch electrodes comprises a plurality of nested annular touch electrode sections arranged at an interval; and
   every two adjacent touch electrode sections in the same touch electrode are electrically connected through a plurality of connection sections;
   wherein the plurality of touch electrodes comprise:
   a plurality of first touch electrodes extending in a first direction, and
   a plurality of second touch electrodes extending in a second direction;
   wherein the respective touch electrodes are arranged at the same layer;
   each of the plurality of first touch electrodes comprises a plurality of first sub-touch electrodes arranged to be spaced from the plurality of second touch electrodes; and each of the plurality of first sub-touch electrodes comprises a plurality of nested annular touch electrode sections arranged at an interval;
   two first sub-touch electrodes in the same first touch electrode, located on two sides of the second touch electrode are electrically connected by being bridged through a first connection line;
   each of the plurality of second touch electrodes comprises a plurality of second sub-touch electrodes and a plurality of second connection lines, and the plurality of second sub-touch electrodes are arranged to be spaced from the plurality of first touch electrodes;
   two second sub-touch electrodes in the same second touch electrode, located on two sides of the first touch electrode are electrically connected through the second connection line; and
   each of the plurality of second sub-touch electrodes comprises a plurality of nested annular touch electrode sections arranged at an interval.

2. The touch panel according to claim 1, wherein there is at least one first connection line electrically connected between two adjacent first sub-touch electrodes.

3. The touch panel according to claim 1, wherein for the plurality of first sub-touch electrodes comprised in each first touch electrode, there is the same pattern of touch electrode sections in respective remaining first sub-touch electrodes except for first sub-touch electrodes located at ends of each first touch electrode.

4. The touch panel according to claim 1, wherein for the plurality of second sub-touch electrodes comprised in each second touch electrode, there is the same pattern of touch electrode sections in respective remaining second sub-touch electrodes except for second sub-touch electrodes located at ends of each second touch electrode.

5. The touch panel according to claim 1, wherein for respective remaining first sub-touch electrodes except for first sub-touch electrodes located at ends of each first touch electrode, and respective remaining second sub-touch electrodes except for second sub-touch electrodes located at ends of each second touch electrode, a pattern of touch electrode sections in the respective remaining first sub-touch electrodes is the same as a pattern of touch electrode sections in the respective remaining second sub-touch electrodes.

6. The touch panel according to claim 1, wherein the plurality of touch electrodes comprise self-capacitive electrodes arranged in an array.

7. The touch panel according to claim 1, wherein the touch panel further comprises dummy strip electrodes arranged at gaps between two adjacent touch electrodes.

8. The touch panel according to claim 7, wherein a width of a gap between each touch electrode and an adjacent dummy strip electrode lies between 20 micrometers and 30 micrometers.

9. The touch panel according to claim 7, wherein the dummy strip electrodes are arranged at the same layer as the plurality of touch electrodes.

10. The touch panel according to claim 1, wherein a width of a gap between adjacent touch electrode sections lies between 20 micrometers and 30 micrometers.

11. The touch panel according to claim 1, wherein connection sections are distributed uniformly between every two adjacent touch electrode sections.

12. The touch panel according to claim 1, wherein pattern of the touch electrode sections comprises at least one of a triangle, a diamond, or a rectangle.

13. The touch panel according to claim 12, wherein the pattern of the touch electrode sections is the diamond; and an angle between one side of the pattern of the touch electrode sections in the first sub-touch electrodes, and one of a first direction or a second direction, ranges from 30 to 60 degrees.

14. The touch panel according to claim 1, wherein edges of the touch electrode sections are at least one of straight, curved, or folded.

15. A touch display device, comprising a touch panel, wherein the touch panel comprises:
    an underlying substrate; and
    a plurality of touch electrodes arranged on the underlying substrate, and insulated from each other;
    wherein
    at least one of the plurality of touch electrodes comprises a plurality of annular touch electrode sections arranged at an interval; and
    every two adjacent touch electrode sections in the same touch electrode are electrically connected through a plurality of connection sections;
    wherein the plurality of touch electrodes comprise:
        a plurality of first touch electrodes extending in a first direction, and
        a plurality of second touch electrodes extending in a second direction;
    wherein the respective touch electrodes are arranged at the same layer;
    each of the plurality of first touch electrodes comprises a plurality of first sub-touch electrodes arranged to be spaced from the plurality of second touch electrodes; and each of the plurality of first sub-touch electrodes comprises a plurality of nested annular touch electrode sections arranged at an interval;
    two first sub-touch electrodes in the same first touch electrode, located on two sides of the second touch electrode are electrically connected by being bridged through a first connection line:
    each of the plurality of second touch electrodes comprises a plurality of second sub-touch electrodes and a plurality of second connection lines, and the plurality of second sub-touch electrodes are arranged to be spaced from the plurality of first touch electrodes;
    two second sub-touch electrodes in the same second touch electrode, located on two sides of the first touch electrode are electrically connected through the second connection line; and
    each of the plurality of second sub-touch electrodes comprises a plurality of nested annular touch electrode sections arranged at an interval.

16. The touch display device according to claim 15, wherein a width of a gap between adjacent touch electrode sections lies between 20 micrometers and 30 micrometers.

17. The touch display device according to claim 15, wherein connection sections are distributed uniformly between every two adjacent touch electrode sections.

18. The touch display device according to claim 15, wherein pattern of the touch electrode sections comprises at least one of a triangle, a diamond, or a rectangle.

19. The touch display device according to claim 18, wherein the pattern of the touch electrode sections is the diamond; and an angle between one side of the pattern of the touch electrode sections in the first sub-touch electrodes, and one of a first direction or a second direction, ranges from 30 to 60 degrees.

20. The touch display device according to claim 15, wherein edges of the touch electrode sections are at least one of straight, curved, or folded.

* * * * *